(12) United States Patent
Jeal et al.

(10) Patent No.: US 9,485,249 B2
(45) Date of Patent: Nov. 1, 2016

(54) USER AUTHENTICATION IN A MOBILE TELECOMMUNICATIONS SYSTEM

(75) Inventors: David Jeal, Marlborough (GB); George Stronach Mudie, Thatcham (GB); Charles William Debney, Kintbury (GB)

(73) Assignee: VODAFONE GROUP PLC, Newbury, Berkshire (GB)

( * ) Notice: Subject to any disclaimer, the term of this patent is extended or adjusted under 35 U.S.C. 154(b) by 1937 days.

(21) Appl. No.: 10/574,808

(22) PCT Filed: Jul. 28, 2004

(86) PCT No.: PCT/GB2004/003252
§ 371 (c)(1),
(2), (4) Date: Jan. 30, 2007

(87) PCT Pub. No.: WO2005/043357
PCT Pub. Date: May 12, 2005

(65) Prior Publication Data
US 2007/0143828 A1    Jun. 21, 2007

(30) Foreign Application Priority Data

Oct. 9, 2003  (GB) .................................. 0323693.2
Oct. 10, 2003 (GB) .................................. 0323836.7

(51) Int. Cl.
*G06Q 20/00*    (2012.01)
*H04L 29/06*    (2006.01)
(Continued)

(52) U.S. Cl.
CPC ......... *H04L 63/0853* (2013.01); *G06F 21/123* (2013.01); *G06F 21/34* (2013.01); *H04L 63/0442* (2013.01); *H04L 63/0846* (2013.01)

(58) Field of Classification Search
USPC ............ 705/64, 16, 21, 59, 71; 380/44, 262, 380/278, 279
See application file for complete search history.

(56) References Cited

U.S. PATENT DOCUMENTS 5,644,710 A    7/1997    Johnson
5,813,421 A    9/1998    Wang
(Continued)

FOREIGN PATENT DOCUMENTS

EP    0 927 921    7/1999
EP    1 315 064    5/2003
(Continued)

OTHER PUBLICATIONS

"Trusted Transaction Roaming"—pp. 13-17, issue Jan. 2003—Secure (an Infineoun Tech. Publication)—Note the concept of providing secure network access for E-Commerce from mobile phones.
(Continued)

*Primary Examiner* — Dante Ravetti
(74) *Attorney, Agent, or Firm* — B. Aaron Schulman, Esq.; Nicholas Trenkle; Stites & Harbison, PLLC.

(57) ABSTRACT

A computer, such as a Windows-based PC (10), has associated with it a Subscriber Identity Module (or SIM) (12), such as of the type used in a GSM cellular telephone system. The SIM (12) can be authenticated by the telephone network (16), in the same way as for authenticating SIMs of telephone handset users in the network, and can in this way authenticate the user of the PC (10) or the PC (10) itself. Such authentication can, for example, permit use of the PC (10) in relation to a particular application (22) which is released to the PC (10) after the authentication is satisfactorily completed. The application may be released to the PC (10) by a third party after and in response to the satisfactory completion of the authentication process. A charge for the session can be debited to the user by the telecommunications network and then passed on to the third party.

22 Claims, 12 Drawing Sheets

(51) Int. Cl.
*G06F 21/12* (2013.01)
*G06F 21/34* (2013.01)

(56) References Cited

U.S. PATENT DOCUMENTS

| | | | |
|---|---|---|---|
| 5,933,785 A * | 8/1999 | Tayloe | 455/558 |
| 6,105,012 A | 8/2000 | Chang et al. | |
| 6,134,549 A | 10/2000 | Regnier | |
| 6,154,839 A | 11/2000 | Arrow | |
| 6,161,182 A | 12/2000 | Nadooshan | |
| 6,229,806 B1 | 5/2001 | Lockhart | |
| 6,327,578 B1 | 12/2001 | Linchan | |
| 6,339,423 B1 | 1/2002 | Sampson | |
| 6,507,656 B1 | 1/2003 | Jakobsson | |
| 6,553,494 B1 | 4/2003 | Glass | |
| 6,738,901 B1 | 5/2004 | Boyles et al. | |
| 2001/0005840 A1 * | 6/2001 | Verkama | G06Q 20/102 705/67 |
| 2001/0045451 A1 | 11/2001 | Tan et al. | |
| 2002/0002545 A1 * | 1/2002 | Resneck | 705/74 |
| 2002/0059530 A1 * | 5/2002 | Talvitie | H04L 63/0853 726/8 |
| 2002/0087473 A1 | 7/2002 | Harif | |
| 2003/0028763 A1 * | 2/2003 | Malinen et al. | 713/155 |
| 2003/0055792 A1 * | 3/2003 | Kinoshita | G06Q 20/04 705/67 |
| 2003/0078058 A1 | 4/2003 | Vatanen et al. | |
| 2003/0097444 A1 | 5/2003 | Dutta et al. | |
| 2003/0171993 A1 * | 9/2003 | Chappuis | G06Q 20/04 705/16 |
| 2003/0177347 A1 * | 9/2003 | Schneier et al. | 713/151 |
| 2003/0202661 A1 * | 10/2003 | Rodriguez et al. | 380/239 |
| 2005/0102519 A1 | 5/2005 | Morper | |

FOREIGN PATENT DOCUMENTS

| | | |
|---|---|---|
| GB | 2394327 | 4/2004 |
| GB | 2 396 707 | 6/2004 |
| JP | 2002232962 | 8/2002 |
| JP | 2003189361 | 7/2003 |
| JP | 2003203056 | 7/2003 |
| JP | 2003219475 | 7/2003 |
| WO | WO 00/67415 | 11/2000 |
| WO | WO 01/33936 | 5/2001 |
| WO | WO 02/39237 | 5/2002 |
| WO | WO 02/079960 | 10/2002 |
| WO | WO 02/091316 | 11/2002 |
| WO | WO 03/084175 | 10/2003 |

OTHER PUBLICATIONS

Extended European Search Report for European Application No. 10 18 2908, May 30, 2012, European Patent Office, Munich, Germany.

* cited by examiner

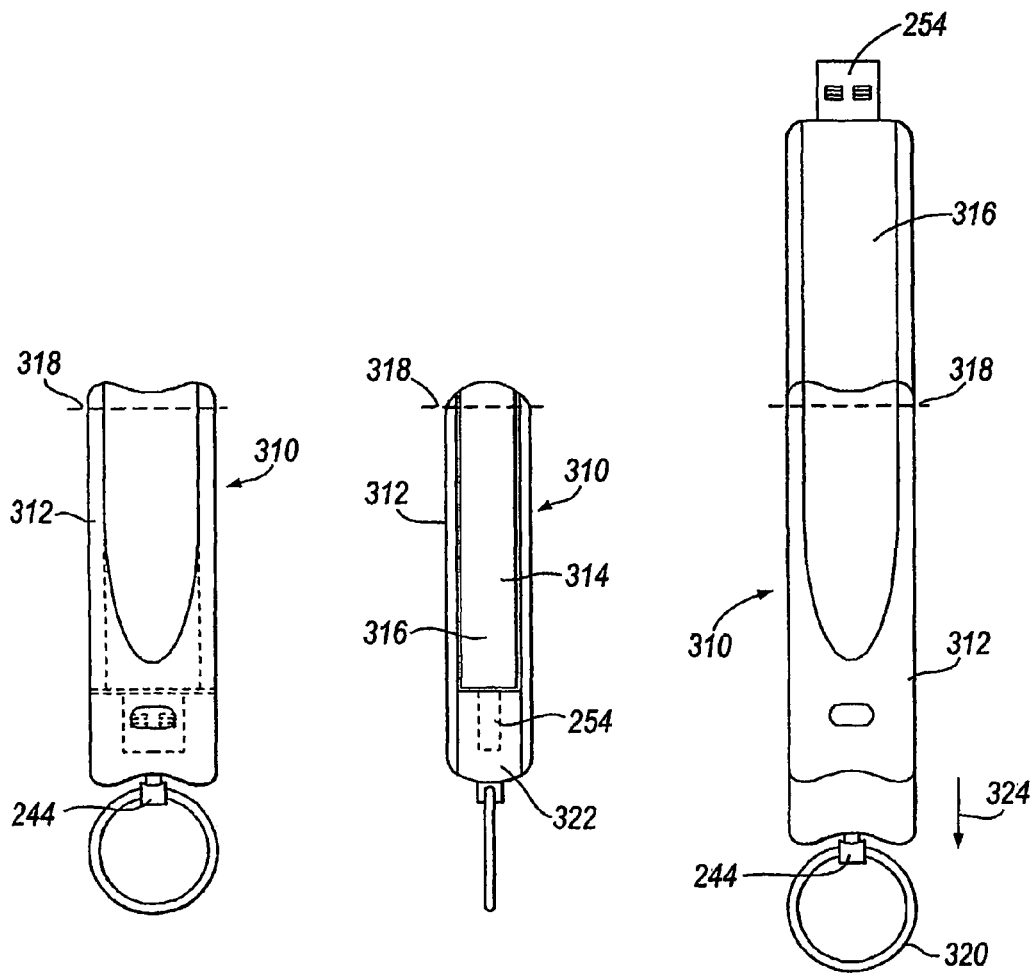

USER AUTHENTICATION IN A MOBILE TELECOMMUNICATIONS SYSTEM

BACKGROUND OF THE INVENTION

The invention relates to the facilitation and authentication of transactions. In embodiments of the invention, to be described below in more detail by way of example only, transactions between data processing apparatus (such as a personal computer), or a user thereof, and a (possibly remote) third party are facilitated and authenticated, and such facilitation and authentication may also involve the facilitation and authentication of a payment or data transfer to be made by or on behalf of the user to the third party.

SUMMARY OF THE INVENTION

According to a first aspect of the invention, there is provided a method for carrying out an authentication process for authenticating a transaction with data processing apparatus, in which at least during the authentication process the data processing apparatus has operatively associated with it a selected one of a plurality of authentication storage means each for storing predetermined authentication information, the authentication storage means being registrable with a common system, and including the step of carrying out the authentication process via a communications link with that system, the authentication process being carried out by authenticating means incorporated in the system and involving the use of the predetermined authentication information stored by the selected one authentication storage means.

According to a another aspect of the invention, there is provided data processing apparatus in combination with a selected one of a plurality of authentication storage means each for storing predetermined authentication information relating to the carrying out of an authentication process for authenticating a transaction with the data processing apparatus, the authentication storage means all being registrable with a common system, the authentication storage means when operatively associated with the data processing apparatus being operative to carry out the authentication process via a communications link with that system, the authentication process being carried out by authenticating means incorporated in the system and involving the use of the predetermined authentication information stored by the selected one authentication storage means.

According to a another aspect of the invention, there is provided a device for coupling to data processing apparatus for enabling an authentication process involving the use of separate authenticating means, the device being configured to provide a plurality of separately activatable authentication information records for use in the authentication process, the authentication information records being registered with a system including the authenticating means, the device being responsive to an input message for deriving a response dependent on the input message and on the activated authentication information record for enabling the authenticating means to carry out the authentication process via a communication link with the authenticating means in the said system whereby to authenticate a transaction.

According to a another aspect of the invention, there is provided an authentication system for authenticating transactions of users registered with that system to enable a transaction with another system to be authenticated, the authentication system including authentication means for sending an authentication message in response to an authentication request from a subscriber and for receiving and analysing a response thereto to determine if the received response corresponds to an expected response to authenticate the identity of the user; and security token generating means for generating a security token for use in performing a transaction with the other system.

According to a another aspect of the invention, there is provided a system for storing user data for use in performing transactions with a plurality of service providers, wherein for each user a plurality of data records are stored for use when performing transactions with respective service providers, and wherein only a data record relevant to a particular service provider is made available in response to a request on behalf of that service provider.

According to a another aspect of the invention, there is provided a data packet for use in authenticating and performing a transaction between a client and a product or service provider, the data packet including data indicative of the product or service provider identity such that the data packet is only useable to authenticate and perform a transaction with that product or service provider.

According to a another aspect of the invention, there is provided a method of facilitating transactions between a plurality of users registered with an authentication system and plurality of product or service providers, the method including:

provding each user with authentication storage means storing predetermined authentication information, each authentication storage means being coupleable to data processing apparatus for data exchange therewith;

generating in response to a request, made using data processing apparatus, from a user to a product or service provider a transaction request data packet including data indicative of the identity of the user and the identity of the product or service provider;

transmitting the transaction request data packet to the authentication system via the data processing apparatus;

analysing in the authentication system the transaction request data packet and extracting therefrom the identity of the user;

transmitting from the authentication system an authentication request signal to the user's authentication storage means via the data processing apparatus;

receiving via the data processing apparatus a response from the user's authentication storage means at the authentication system;

analysing said response at the authentication system to determine whether said response corresponds to an expected response with reference to knowledge of said predetermined authentication information for that user;

generating an authentication token and providing this to the product or service provider via the data processing apparatus, the authentication token indicating to the product and service provider that the user is authenticated by the authentication system.

BRIEF DESCRIPTION OF THE DRAWINGS

A method according to the invention of facilitating and authenticating transactions involving data processing apparatus such as a personal computer, and devices for connection to data processing apparatus (such as a personal computer) embodying the invention, will now be described, by way of example only, with reference to the accompanying diagrammatic drawings in which:

FIG. 11A shows a front view of a sixth configuration of a dongle;

FIG. 11B shows a side view of the dongle of FIG. 11A; and

FIG. 11C shows how the electrical connector emerges from the casing of the dongle.

In the figures like elements are generally designated with the same reference numbers.

MODES OF CARRYING OUT THE INVENTION

Figure 1:
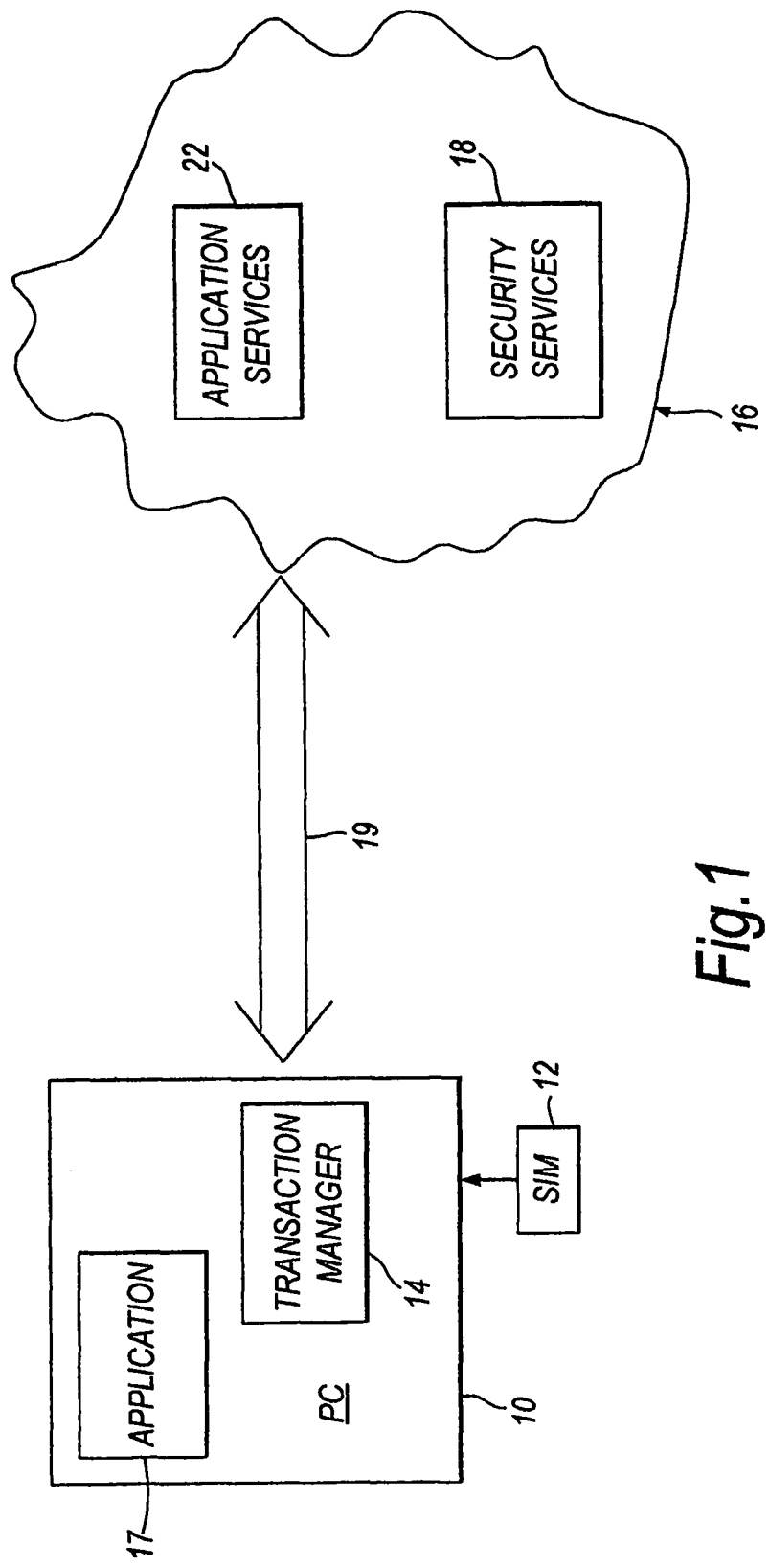
FIG. 1 is a block diagram for explaining the operation of the method in relation to the data processing apparatus.

There exist many instances when a transaction involving the use of data processing apparatus requires authentication. For example, the data processing apparatus may be required to carry out a transaction, such as the exchange of information, with a third party, such as a remote third party with which the communication must be made over a telecommunications link (including via the Internet). The third party may require that the data processing apparatus, or the user thereof for the time being, is authenticated to the satisfaction of the third party before the transaction takes place.

As stated, the transaction may merely involve the exchange of information. For example, the user of the data processing apparatus may simply need to be authenticated in order to download information from the third party. Such information may be information kept by the third party on behalf of the user of the data processing apparatus (for example, information relating to the user's bank account). Instead, the information might be information held on other data processing apparatus, such as a data network belonging to an organisation or commercial entity with which the user is connected or by whom the user is employed, thus facilitating access to that network by the user when the user is travelling. Another possible transaction may involve the downloading by the data processing apparatus of software from the remote location.

In addition, the transaction may require a payment to be made by the user in order to enable the transaction to take place, such as a payment to the third party in return for the information provided. Clearly, when such a payment is involved, it is important that the user is authenticated to the satisfaction of the third party and that the payment is made in a safe, simple and secure manner.

Although the foregoing discussion has referred to a "user" of the data processing apparatus, some at least of the transactions described above may not in fact involve any human user: the data processing apparatus may be required to operate automatically (for example, intermittently operating in an information-gathering or monitoring role, and reporting the results to a third party). In such cases, it may alternatively or additionally be necessary for the data processing apparatus to authenticate itself to the satisfaction of the third party.

The data processing apparatus is provided with, or associated with, means (authentication storage means) for storing predetermined authentication information for authenticating that apparatus or a particular user thereof. In one embodiment, the means for storing the predetermined information is removable and can thus be taken by the user and inserted into any data processing apparatus (or computer) which is adapted to receive it, so as to enable that user to be authenticated in respect of a transaction to be carried out by that user with that computer. Advantageously, in such a case the means for storing the predetermined information is in the form of a smart card.

In a more specific example, the smart card is a Subscriber Identity Module or SIM of the type used in and for authenticating the use of handsets in a mobile or cellular telecommunications network—such as a GSM (Group Special Mobile) or 3G (Third Generation) network. Such a network will store details of its users' (subscribers') SIMs. In operation of the network, a user's handset is authenticated (for example, when the user activates the handset on the network with a view to making or receiving calls) by the network sending a challenge to the handset incorporating that SIM, in response to which the SIM calculates a reply (dependent on the predetermined information held on the SIM—typically an authentication algorithm and a unique key Ki) and transmits it back to the network which checks it against its own information for that user or subscriber in order to complete the authentication process. In the same way, therefore, the SIM can be used in or in association with the data processing apparatus or computer so that the same form of authentication process can be carried out. In a case where the SIM is the SIM of a subscriber to a particular cellular telecommunications network, the authentication process can be carried out by that network.

It should be noted that the authentication process being described does not necessarily authenticate the human identity of the user. For example, cellular telecommunication networks have pre-pay subscribers who are issued with SIMs in return for pre-payment enabling them to make calls on the network. However, the identity of such pre-pay subscribers is not known (or not necessarily known) by the networks. Nevertheless, such a user cannot make use of the network until the network has authenticated that user's SIM —that is, has confirmed that such user is a particular user who has a particular pre-paid account with the network. The SIMs of such pre-paid users or subscribers could equally well be used (in the manner described) in or in association with data processing apparatus or computers, for the purposes of authenticating that user.

The SIM need not take the form of a physical (and removable) smart card but instead can be simulated by being embedded in the data processing apparatus or computer in the form of software or represented as a chip for example.

It may be desirable to be able to change the authentication information on the SIM (or simulated SIM) to take account of changed circumstances. For example, the SIM may be a SIM registered with a particular cellular telecommunications network—a network applicable to the country or region where the data processing apparatus or computer is to be used. However, circumstances may arise (for example, the apparatus or the computer is physically moved to a different country or region) in which it is desirable or necessary to re-register the SIM with a different cellular telecommunications network. Ways in which this can be done are disclosed in our co-pending United Kingdom patent applications Nos. 0118406.8, 0122712.3 and 0130790.9 and in our corresponding PCT applications Nos. GB02/003265, GB02/003260 and GB02/003252. As described therein in more detail, a SIM (and thus also a simulated SIM) may be initially provided with authentication (and other) information relating to each of a plurality of networks, the information respective to the different networks being selectively activatable.

It is not necessary, however, for the users to be subscribers to a telecommunications network. Instead, they could be subscribers registered with some other centralised system which could then carry out the authentication process in the same way as in a telecommunications network. In such a case, the registration of a SIM (or simulated SIM) could be transferred from one such centralised system to another in the same manner as described above.

As described above, an aim of the authentication process is to facilitate a transaction between the data processing apparatus or computer and a third party. Where the authentication process is carried out by a telecommunications network, or by some other system, to which the user of the SIM is a subscriber, the satisfactory completion of the authentication process would then be communicated by that network or system to the third party—to enable the transaction to proceed.

For many transactions of the type described, a payment by the user to the third party may be involved. An arrangement as described above, in which the authentication process is carried out by a telecommunications network or other centralised system to which the user is a subscriber advantageously facilitates the making of such payments and is particularly advantageous where (as may often be the case) the payment is for a small amount (for example, payment in return for receipt of information—e.g. weather or traffic information, or for temporary use of specific software); in such a case, the payment can be debited to the account of the subscriber held by the telecommunications network or other centralised system—and then, of course, passed on to the third party, perhaps after deduction of a handling charge.

The block diagram of FIG. 1 schematically illustrates one way of operating the method described above.

A Windows-based personal computer or PC 10 is shown ('Windows' is a trade mark). The PC 10 is adapted to receive a SIM shown diagrammatically at 12. The SIM may be removably fitted to the PC, for use in identifying a user (that is, the holder of the SIM) or may be fixed within the PC (for identifying the PC itself). The PC 10 incorporates transaction management software 14 which interacts with and controls some of the functions of the SIM.

Although an arrangement has been described where the PC 10 is adapted to receive a SIM, it should be appreciated that a smart card other than a SIM might be used, and this is in accordance with the invention. Further, rather than the SIM (or smartcard) being received by the PC—by being removably fitted to the PC or fixed within the PC—the SIM (or smartcard) could be associated with the PC in any way that allows communication between the SIM (or smartcard) and the PC 10. For example, the SIM (or smartcard) could be provided with a "dongle" (examples of which are described hereinafter in detail) which allows wired or wireless communication with the PC 10. Preferably, the communication between the SIM (or smartcard) and the PC 10 is secure. The communications may be encrypted, or any other means for secure communication may be employed.

Also shown in FIG. 1 is a cellular telephone network 16, such as the Vodafone (trade mark) network, and it is assumed that the SIM 12 is registered with the network 16.

The operation of the system shown in FIG. 1 will be explained in relation to the flow chart of FIG. 2.

At step A, the user of the PC 10 requests use of a particular application 17 on the PC. For example, the user might wish to view web pages containing specialised information which are encrypted and thus not generally available. In order to do this, the user requests a "session key"—that is, for example, permission to carry out a transaction involving time-limited use of the particular application. The request for the session key is addressed to the transaction manager 14. The transaction manager 14 then, transmits identification information derived from the SIM 12 (an "I am here" message) to the security services part 18 of the network 16 (step B). In response to the "I am here" message, the network transmits a random challenge (step C) to the transaction manager 14, this challenge being based on information known to the network about the SIM 12.

The double-headed arrow 19 in FIG. 1 indicates schematically the two-way data communication between the PC 10 and the network 16. This data communication may be over any suitable communication medium. For example, the communication medium may be a fixed telephone network (such as PSTN) or a wireless network. For example, the wireless network may be the same as the network 16 which provides security services 18, or may be another network. The data communication may be performed via the Internet. The data communication is preferably in a form that is secure and encrypted.

At step D, the transaction manager 14 transmits a response from SIM 12 to the challenge by providing an answer derived from the challenge and the key held on the SIM. The reply is checked by the security services part 18 of the network 16. Assuming that the response is satisfactory, the security services part 18 authenticates the user and confirms this to the transaction manager 14 (step E)—possibly by providing a populate Security Token. At the same time, the security services part 18 in the network transmits the session key (step F) to the application services part 22 of the network 16.

The transaction manager 14 also transmits the session key to the application 17 (step G).

In the embodiment described, the transaction manager facilitates the transfer of data to and from the SIM 12. There is no requirement for the transaction manager to be able to understand or interpret this data. The function of the transaction manager in the embodiment being described is to act as a conduit for the data being passed to and from the SIM 12.

The user can now make the request for the particular application (step H), accompanying this application request with the session key received at step G. The application request of step H is transmitted to an application services part 22 which may be part of the network 16 (as shown) or may be separate and controlled by a third party. At step I the application services part compares the session key received with the application request (step H) with the session key received at step F. Assuming that the result of this check is satisfactory, the application services part 22 now transmits acceptance of the application request (step J) to the PC 10, and the application now proceeds. The session key may allow time limited use of the application server 22, a single use or infinite use—depending on the circumstances. The network can now debit the user's account with a charge for the session. There may be communication link between the application services part 22 and the security services part 18 to allow data exchange between those parts—for example to allow the security services part 18 to arrange for the user's account with the network 16 to be debited.

The foregoing is of course merely one simple example of an implementation of what has been described.

In an alternative arrangement, a data carrier may be provided with means for storing predetermined information such as in one of the forms described above—that is, a SIM or (more probably) software simulating a SIM. The simulated SIM is associated with data stored on the data carrier. The data carrier may, for example, be a DVD or CD ROM or some other similar data carrier, and the data thereon may be software or a suite of software.

The simulated SIM may be used to identify and authenticate the data (such as the software) on the data carrier. The simulated SIM will be registered with a telecommunications network or some other centralised system, in the same manner as described above. When the data carrier is placed in data processing apparatus such as a computer, for use therein, the SIM would be used to identify and authenticate the data carrier and the data stored thereon and (for example) could then permit the software to be downloaded for use in the computer. In this way, the SIM could be used subsequently to block further use of the software (for example, in another computer), or to allow the data to be used for only a predetermined number of times (whether in the same or in a different computer). If, for example, the data carrier (with its SIM) is placed in a computer which has also received a particular user's SIM then (a) the SIM on the data carrier can be used to identify and authenticate the software and (b) the SIM in or associated with the computer can be used to authenticate the user and could subsequently be used to enable a charge to be debited to that user as payment for use of the software.

The data stored on the data carrier with the SIM may, for example, be encrypted data. That encrypted data can only be encrypted using information provided by the SIM on the data carrier. In this way, the SIM on the data carrier may control use of the data stored on the data carrier. For example, the data carrier may be sold with a particular licence giving a user restricted rights to use the data on the data carrier. The user may be allowed to use the data for a predetermined time period or for a predetermined number of times. Each time the data is used it is decrypted using data stored on the SIM. A record in the SIM (or elsewhere) is maintained of the number of times that the data is decrypted. When the number of times that the data has been decrypted equals the number of times provided in the licence sold with the data carrier, the SIM prevents further use of the data by not decrypting the data. If the data is provided with a licence that lasts until the predetermined time, each time the SIM decrypts the data, the SIM will check that the current time (with reference to a suitable clock provided, for example, on the SIM, on the PC 10 or with reference to the network 16) so that decryption of the data is only performed up to the time specified in the licence sold with the data carrier.

Although a simulated SIM is described above, it is presently preferred that the SIM is implemented in hardware because this is more secure. The secret authentication data on a hardware SIM is inaccessible to unauthorised persons.

Rather than the PC 10 being adapted to receive a SIM 12, or a data carrier being modified to incorporate a SIM or software simulating a SIM, a separate device or "dongle" 30 may be provided for receiving the SIM 12, or for incorporating software simulating the SIM 12.

Figure 3:
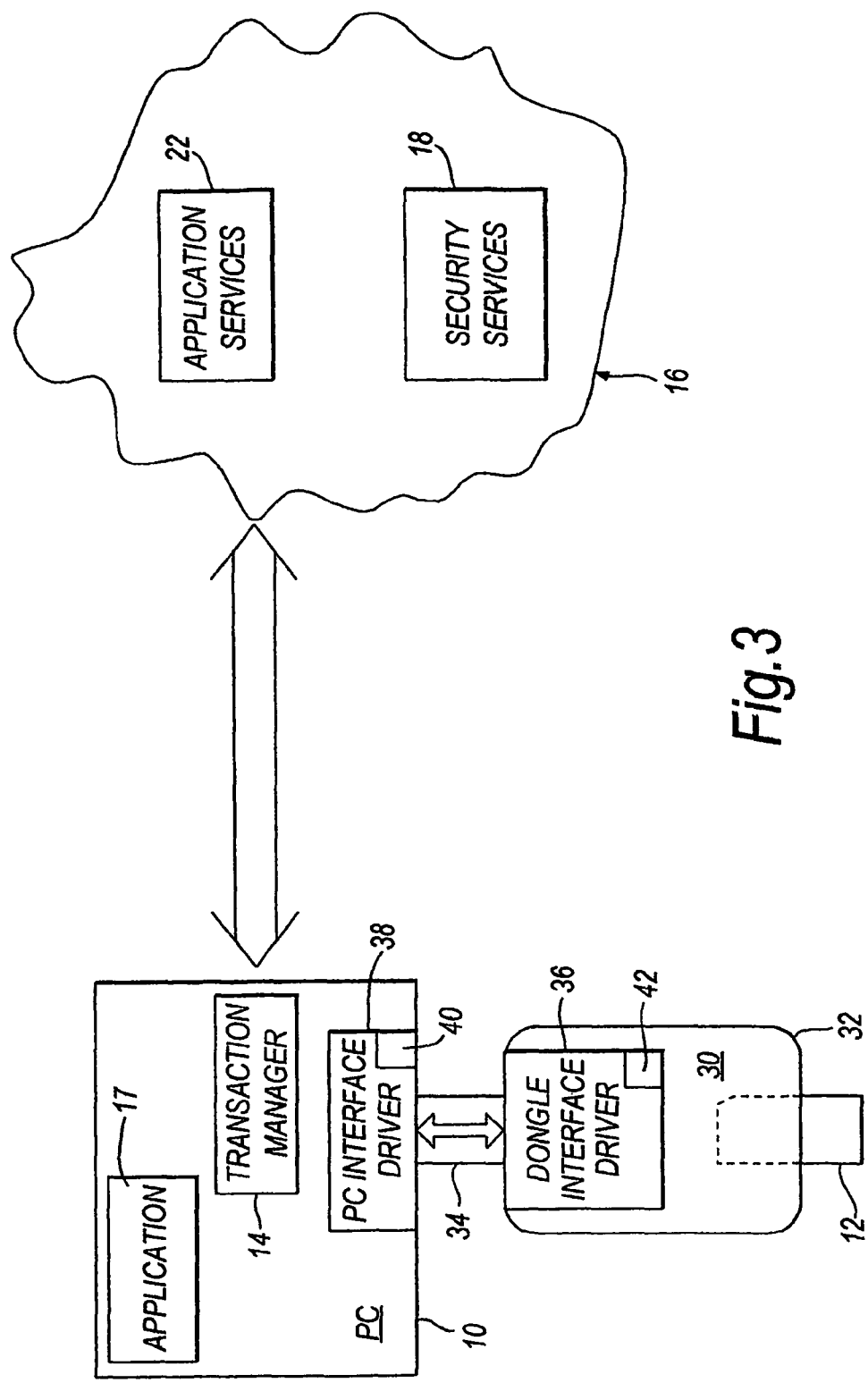
FIG. 3 is a block diagram corresponding to FIG. 1 in which a "dongle" in accordance with the invention is used.

FIG. 3 shows a dongle 30 that allows data for authenticating a transaction (or for any other appropriate purpose) to be passed between the dongle 30 and the PC 10 and onwardly to/from the network 16.

The dongle 30 comprises a housing 32 having a slot for receiving a SIM 12. The housing 32 may be made of any suitable material. Preferably, this material is electrically insulating. For example, the housing may comprise laser activated resin or plastics.

Appropriate connectors (not shown) are provided within the housing 32 for allowing electronic exchange of data between the SIM 12 and the dongle 30. The dongle 30 further comprises a suitable connector 34 for allowing connection for data communication purposes to the PC 10. For example, the connector could be a USB connector, a Firewire 1394 connector or any other suitable connector. Of course, different configurations of the dongle may be provided. For example, the SIM 12 may be accommodated completely within the dongle 30, and may be removable from the dongle 30 by opening the housing 32, or the SIM 12 may be permanently sealed or encapsulated within the dongle casing 32. If the latter arrangement is provided, a user of the telecommunication system may be provided with a first SIM for use, for example, in their mobile telephone handset and may be provided with a dongle 30 which houses a separate SIM which is used for performing transactions via a PC 10. If desired, the telecommunications network will include a record indicating that the SIM within the user's mobile handset and the SIM within the user's dongle are commonly owned, and this information may be used to conveniently provide the user with a single account of charges incurred in respect of use of both the SIMs.

The dongle 30 is provided with a dongle interface driver 36 which controls communication with the PC 10. All communications from the PC10 are routed via the dongle interface driver 36 and data stored on the SIM 12 cannot be accessed other than by using the dongle interface driver 36. A corresponding PC interface driver 38 is provided for the PC 10. The PC interface driver 38 may, for example, comprise a series of commands in the form of a computer programme which is loaded onto and run by the PC 10. The PC interface driver 38 may, for example, be provided by or under the control of the network 16. The PC interface driver 38 will therefore be "trusted" by the network 16 and will be configured to only allow access to the dongle 30 and consequently the SIM 12 in an approved manner which will not allow the security information present on the SIM 12 to be compromised.

To prevent, or to reduce, the likelihood of the PC interface driver 38 being replaced or bypassed by an alternative driver, which could compromise the security of the data on the SIM 12, the PC interface driver 38 and the dongle interface driver 36 are provided with respective shared secret keys 40, 42. Each communication from the PC interface driver 38 to the dongle 30 is encrypted using the shared secret key 40. All communications from the PC 10 to the dongle 30 are received by the dongle interface driver 36. The dongle interface driver 36 comprises processing means for decrypting received communications using its secret key 42. To enhance security, the dongle interface driver 36 will prevent all communications other than those encrypted using the shared secret key 40 from sending data to or receiving data from the SIM 12.

Therefore, the PC interface driver 38 controls and supervises access to the dongle 30 and the SIM 12 to reduce the likelihood of the data stored on the SIM 12 being compromised by unauthorised attempts to access the SIM 12.

Figure 2:
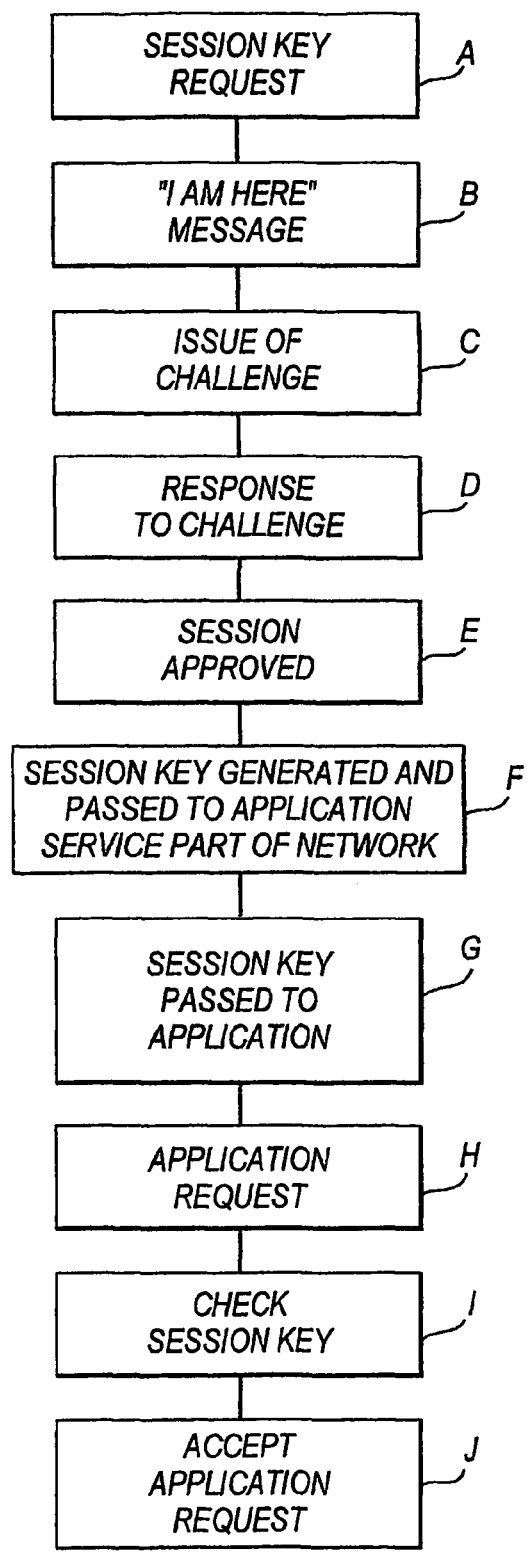
FIG. 2 is a flow chart for use in the understanding of the block diagram of FIG. 1.

Provided that a request for access to data on the SIM 12 is approved by the PC interface driver (according, for example, to criteria set by the network 16), and is therefore communicated to the dongle interface driver 36 with the appropriate key 40, a transaction can be authenticated using the SIM 12 in the manner described in relation to FIGS. 1 and 2.

Although the provision of shared secret keys 40,42 is advantageous, it should be appreciated that the provision of shared secret keys 40,42 is not essential to the invention.

In an alternative arrangement the PC interface driver 38 is not provided with a particular secret key 40. However, the dongle interface driver 36 is provided with a key 42. When the dongle 30 is coupled to the PC 10 the PC interface driver 38 detects that the dongle interface driver is provided with a key 42. The PC interface driver 38 may then obtain from the network 16 via communications link 19 a key that will allow data exchange between the PC interface driver 13 and the dongle interface driver 36 encrypted using the key 42. For example, the key 42 of the dongle interface driver 36 may be a private key and the key 40 provided to the PC interface driver by the network 16 may be a public key—the two keys being a public-private key pair. The keys provided by the network 16 are preferably not provided on request by any application. For example, the network 16 may be configured to only provide these keys to a trusted PC interface driver and/or after some authentication process.

Alternatively, the data transfer between the dongle interface driver 36 and the PC interface driver 38 may be not encrypted, or may be encrypted in a way that is common to many dongle interface drivers and PC interface drivers provided on different equipment, which has the advantage of allowing the dongle 30 to be used with a multiplicity of different PCs.

As an added security measure, communications between the PC interface driver 38 and the transaction manager 14 may be encrypted. For example, those parts may each have a shared secret key and communications between them may be encrypted using the shared secret key.

A further embodiment to the present invention will be described in relation to FIG. 4. According to FIG. 4, the dongle 30 has the SIM 12 accommodated completely within its housing 32, and the SIM cannot therefore be seen in the Figure. The dongle 30 has a connector 34 for connection to a PC 10 in a similar manner to the FIG. 3 embodiment. At the opposite end of the casing 32 an optional loop connector 44 may be provided to provide a convenient means for carrying the dongle 30 by attaching it to a user's keyring.

One face of the housing 32 has a variety of push buttons 46 mounted thereon, ten of which have respective numerals from 0 to 9 displayed thereon. In this embodiment, the dongle 30 includes means (such as software) for receiving the entry of a PIN number from a user by operating the appropriately designated push buttons 46 which is compared to the PIN number provided for and stored on the SIM 12. The SIMs used in the GSM telecommunications network are conventionally provided with such a PIN.

The housing 32 may further optionally provide a display 48 for prompting the user to enter their PIN number and/or for displaying the PIN number as it is entered, if desired. On entry of the PIN number using the push buttons 46, the entered PIN number is compared to the PIN number stored on the SIM. If the PINs are found to match, communication between the SIM and the PC 10 is permitted to authenticate one or more transactions. The comparison between the entered PIN number and the PIN number stored on the SIM 12 is performed within the dongle 30, and neither the entered PIN number nor the PIN number stored on the SIM is communicated to the PC10. This prevents or reduces the likelihood that the PINs will become compromised by disclosure to an authorised party.

To allow entry of the PIN the dongle 30 requires a power supply. Power can be provided by the PC 10. Advantageously, the PIN has its own temporary power supply which allows the PIN to be entered and verified. Subsequently, the power supply is interrupted and the PIN data is lost. This is an additional security feature, and is described in more detail below.

Figure 4:
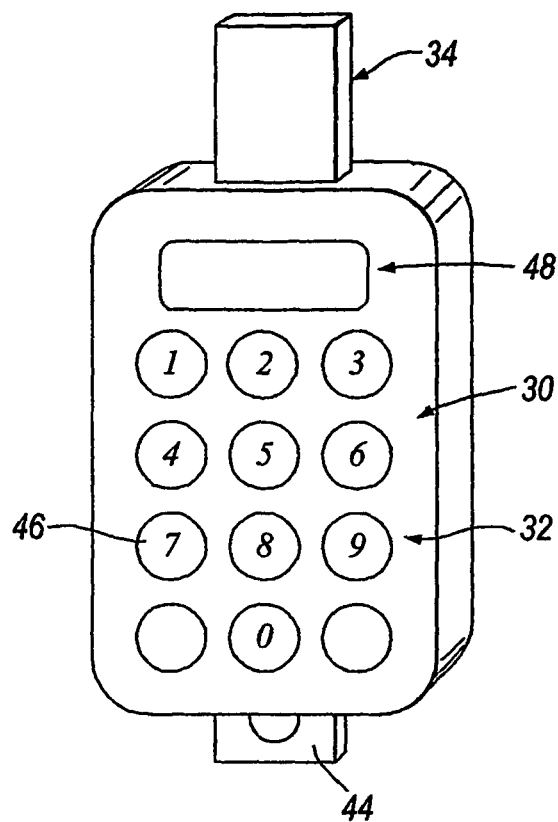
FIG. 4 is a perspective view of one configuration of a dongle.

The PIN entry comparison arrangement of FIG. 4 may be provided in addition to or as an alternative to the interface drivers 36,38 and shared secret keys 40,42 of the arrangement shown in FIG. 3.

It should be appreciated that as an alternative to push buttons 46, other means could be provided for allowing PIN entry. Alternatively, the user could be authorised to use the SIM by obtaining some other security information from the user and comparing this with data stored on the SIM 12. For example, the data obtained could be the user's fingerprint or some other characteristic which is unlikely to re-occur on another person—for example, any suitable biometric data. The details of the fingerprint (or other information) are stored on the SIM for comparison with the input data representing the characteristics.

As an additional security feature in the FIG. 4 embodiment, a display may be provided which displays the name of the application or organisation which requests information from the SIM 12. This would allow the user to monitor requests being made to his SIM 12.

If the respective interface drivers 36,38 and shared secret keys 40,42 described in relation to FIG. 3 are used in a system which also includes the PIN entry and comparison arrangement described in relation to FIG. 4, to provide an added level of security, the dongle 30 can be programmed to display the name of the application or organisation requesting data from the SIM 12 and may then prompt the user to approve the supply of data for each or selected applications/organisations by entering the user's PIN using keypad 46. As an alternative to entering a PIN the, user could be prompted to activate a "confirm transaction" button or the like.

The dongle 30 may be used to facilitate transactions with data processing apparatus other than PCs. For example, a user having an account with network 16 and being provided with a dongle 30 can insert the connector 34 into an appropriately configured slot in a parking meter which is connectable to the network 16. The SIM 12 contained within the dongle 30 is authenticated in the manner described above using a transaction manager provided within the parking meter. By this means, payment for parking can be made by deducting an appropriate amount from the user's account with the network 16. Advantageously, the dongle 30 will be provided with push buttons 46 and the dongle will prompt the user to enter a PIN which is compared to the PIN stored on the SIM so that the dongle 30 cannot be used by an unauthorised party. The dongle could be programmed to allow the push buttons 46, under control of the parking meter, to allow entry of data relevant to the transaction—for example, the length of time for which the parking space is required.

The dongle 30 could, for example, also be used in a similar way with an appropriately configured DVD player to allow a film to be viewed on payment of a fee deducted from the user's account with the network 16. The system may be arranged to allow the dongle 30 to operate as a key in a digital rights management scheme, as described in our co-pending patent application entitled "Data Processing" filed on even date with the present application. The dongle could also allow products to be purchased from an appropriately configured vending machine or tickets to be purchased from an appropriately configured ticketing machine. Such machines will include a processor so that the functions corresponding to those performed by the transaction manager 14 of the PC 10 can be performed by the machines.

In the above description it has been indicated that the SIM used to authenticate the transaction could have the form of a conventional SIM which is either inserted in an appropriate slot within the PC 10 or in the dongle 30 (if provided). This could simply be the SIM that a subscriber to a mobile network uses in their conventional mobile terminal to make and receive calls. Alternatively, the SIM 12 could be embedded within the PC 10 or the dongle 30 (such that it cannot be readily removed or cannot be removed at all). Further alternatively, the SIM may not have a separate physical form, but may be simulated by means of software and/or hardware within the PC 10 or the dongle 30. The SIM could be simulated or incorporated into the chip set of the PC 10. For example, the SIM could be incorporated or simulated within the central processor unit of the PC 10. Such an arrangement prevents the SIM (or simulated SIM) being removed from the PC 10 (other than by rendering the PC 10 useless).

If the SIM is of a form that is not readily removable from the PC 10 or dongle 30, a subscriber to the telecommunications system may be provided with a second SIM for use, for example, in their mobile telephone handset.

If, however, the same SIM is used (in the PC 10 or the dongle 30) to authenticate transactions and for use in the conventional manner with the telecommunications network (for example, to make and receive calls using a mobile telephone), the same data may be used to provide authentication of transactions as is used to authenticate the SIM with the mobile telephone network when a call is being made. Alternatively, the SIM may have separate records for performing each authentication type. There may be a first record containing data and/or algorithms for use in authenticating transactions, and a second, separate record for use in the conventional manner for authenticating the terminal with the telecommunications network. The first and second records may have respective authentication keys, unique identifiers to the telecommunications network and/or unique authentication algorithms.

Figure 5:
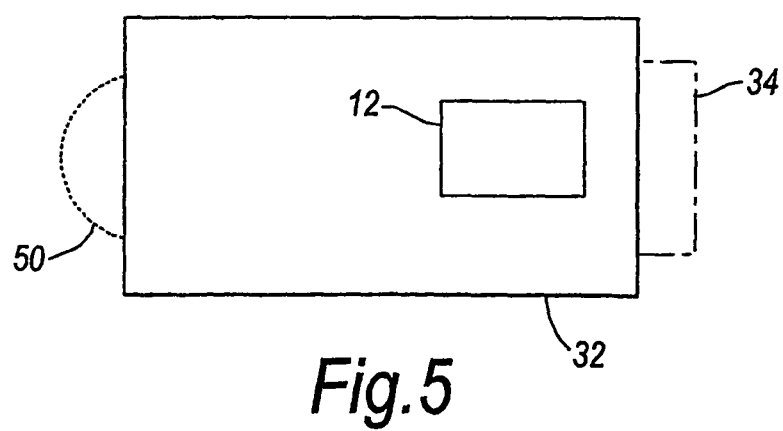
FIG. 5 shows a side elevation of a further configuration of the dongle.

The first record may itself comprise a series of separate records, each registered with the telecommunication network, for allowing transactions authenticated under the control of the separate records to be recognised and billed separately. This is now described in more detail in relation to FIG. 5. In FIG. 5, the dongle 30 may contain a plurality of SIMs 12, or may have a plurality of SIMs simulated within the dongle. Alternatively, rather than a plurality of complete SIMs being provided or simulated, a plurality of different records could be stored on the dongle 30. Whether a plurality of SIMs is provided, a plurality of simulated SIMs is provided or a plurality of alternative records is provided, these can be regarded as respective unique data records which are identifiable to the telecommunications network.

Such an arrangement may be desirable, for example, when a user or subscriber wishes to use their dongle 30 in multiple environments. When the user or subscriber is performing duties for their employer, the dongle 30 will activate the data record associated with the employer. Transactions authorised using that data record will, where appropriate, result in a charge being made to the employer's account. When the user or subscriber is not performing duties for their employer, the personal data record is then activated. Transactions authenticated using the dongle 30 will result in a charge being deducted from the user's personal account. This allows transactions performed by the user or subscriber in a personal capacity to be separated from those performed on behalf of his employer. The mode of the dongle 30 (that is, whether the data record for the employer or the personal data records are activated) may be controlled by a mode switch 50 provided on the dongle 30, or the mode may be altered using software provided in the transaction manager 14 or PC interface driver 38 running on the PC 10. When instructed by the user, the software would cause appropriate signals to be sent to the dongle 30 to change the active SIM, simulated SIM or data record.

As an added security measure, the dongle may require the subscriber to enter a PIN (or provide other data) in order to activate different modes of the SIM (e.g. "employee" mode or "personal" mode). A different PIN could be required to activate each mode.

The dongle 30 thus far described has a physical connector 34 (such as a USB connector) to enable data communication with a PC 10. As an alternative to a physical connector 34, a wireless link between the dongle 30 and the PC 10 may be provided. Data exchange may take place, for example, by using near field techniques, using Bluetooth technology, by infra-red signalling or any other suitable means.

Rather than a separate dongle 30 being provided, a user's SIM may be located in a mobile terminal (such as a mobile telephone handset) in the conventional way. The SIM may authenticate transactions with the PC 10 by suitable data exchange between the mobile terminal and the PC 10. This could be achieved by providing the mobile terminal with a physical connector (such as a USB connector) to connect the PC 10 when authorisation of a transaction is required, or could be done by any of the wireless techniques described above. Preferably, this communication is encrypted or made secure in some other way. If the SIM is provided with separate data records for conventional mobile telecommunications purposes and for authorising transactions, it may be possible to simultaneously make a telephone call, for example, with the telecommunications network and authenticate a transaction with the PC 10. The mobile terminal may conveniently provide the communication link between the PC 10 and the network 16. The coupling of the mobile terminal to the PC 10 therefore in this arrangement not only allows authentication of transactions but also conveniently provides a communication medium between the PC 10 and the network 16. In an alternative arrangement, the mobile terminal still provides communication over a mobile telecommunications network, but this is different to the network 16.

The dongle 30 may also perform the functions of a conventional data card for use with a PC (or other computing device). With this arrangement, the dongle will be of a suitable size and will include suitable connectors for allowing it to operate as a data card, in addition to the dongle having the functions described above.

A further enhanced embodiment of an arrangement for authorising a transaction will now be described with reference to FIG. 6 and the flow chart shown in FIGS. 7A, 7B and 7C.

A client platform, such as PC 10, includes a transaction manager 14. A dongle 30 having a SIM 12 therein is provided and communication between the dongle 30 and the transaction manager 14 is performed via connection 34 (which may be a wired or wireless connection). In this embodiment the transaction manager 14 incorporates the PC interface driver 38 shown in FIG. 3, and therefore the PC interface driver is not shown as a separate item in FIG. 6. Similarly, the dongle 30 incorporates the dongle interface driver shown at 36 in FIG. 3, and therefore a separate dongle interface driver is not shown in FIG. 6.

The PC 10 may, for example, use the Windows™ operating system.

A plurality of client applications 17 are provided on the PC 10, which allow the user to obtain services from respective remote service providers 22. It should be understood that by "remote" it is not intended to imply that there must be a particular geographical distance between the PC 10 and the service providers 22. However, generally the service providers 22 will be controlled independently of the PC 10—although this is not essential.

In this embodiment a mobile telecommunication network 16 provides network services 100, such as SMS, MMS, location based services, etc. The network 16 also provides an authentication service 102 and a payment service 104. However, it should be understood that the network may be any type of network—the invention is not restricted to mobile telecommunication networks. For example, the authentication service 102 and payment service 104 may be provided in a computer that is linked to PC 10 by a local area network, a wide area network and/or the Internet.

When the subscriber wishes to use a service provided by a remote service provider 22 (step A of the flow chart shown in FIG. 7A), the subscriber couples their SIM 12 to the PC 10 by inserting their dongle 30 containing the SIM 12 into the appropriate connecting slot of the PC 12 or using a wireless link (step B). The subscriber then activates on the PC 10 the relevant client application 17 to obtain a required service (step C). For example, the client application 17 could be special software provided by or under control of a service provider 22 for installation on the subscriber's PC 10. Alternatively, a client application 17 might be a web browser for visiting an appropriate web site of the service provider 22.

To illustrate the operation of the system shown in FIG. 6, an example will be given for a subscriber wishing to purchase a particular CD from a vendor which is a service provider 22. Using a graphical user interface present on the PC 10 the subscriber launches web browser software provided on the PC 10 and, via the Internet, accesses the web site of the service provider 22. The web browser software constitutes the client application 17, and allows access to the web site associated with the service provider 22 which distributes CDs.

Data communication between the client application 17 and the service provider 22 may be by a fixed network (e.g. PSTN) or by a wireless network—such as the network 16 or another mobile telecommunications network.

The facility for the subscriber to login to the website may be provided. Advantageously, service providers approved by the network 16 may allow subscribers to register a "pseudonym" with the service provider. The pseudonym has associated with it certain data that the subscriber may wish to use when obtaining service from the service provider. This data is stored by the network 16. The data is not permanently stored by the service provider (although of course the service provider maintains a list of pseudonyms associated with subscribers of the network 16)—for example with reference to the subscriber's SIM identifier.

The Authentication Service may allow a Service Provider to store Pseudonym data against a SIM—with the subscriber's permission. The Pseudonym data will be stored centrally and may be distributed to the SIM by the Authentication Service supplier.

An example of the information that the network 16 holds for a subscriber (subscriber A) is set out below.

Data for Subscriber A
   SIM IDENTIFIER(S)
   MSISDN(S)
   PSEUDONYMS
     FOR Service Provider A
       NAME
       ADDRESS
       PREFERENCES
       BANK ACCOUNT DETAILS
     FOR Service Provider B
       NAME
       ADDRESS
       PREFERENCES
       BANK ACCOUNT DETAILS
     FOR Service Provider C
       NAME
       ADDRESS
       PREFERENCES
       BANK ACCOUNT DETAILS As well as the network 16 storing the data relating to a subscriber's SIM and their MSISDN, the network 16 also includes a list of pseudonyms that the subscriber has established with various service providers (service providers A,B,C, . . . ). The information stored for any particular service provider may be different, and will depend upon what information the service provider might usefully require from the subscriber and upon the information that the subscriber is willing to provide to the service provider. In the example shown, the pseudonym might include details of the name and address of the subscriber and any preferences that they may have relating to the particular service. In the example of a subscriber wishing to purchase a CD from service provider 22, this might include the subscriber's preference for a particular type of music, allowing the service provider to tailor its service, perhaps to offer the subscriber CDs relating to a type of music that the subscriber prefers.

When the user accesses the website, the service provider 22 will cause the subscriber as part of the login procedure to be prompted, using the web browser, to enter a "pseudonym" which that subscriber may have previously registered with the service provider 22 (step D). If a pseudonym has been previously registered by that subscriber with the service provider 22, the subscriber enters their pseudonym and this is sent by the client application 17 (step E) to the service provider 22. The service provider 22, by means of link 106 (FIG. 6) then transmits this pseudonym to the authentication service 102 of the network 16. The authentication service 102 then determines whether the pseudonym is valid as far as the network 16 is concerned, and if it is determined to be valid, the network transmits details stored thereby that are associated with that pseudonym to the service provider 22 (step F).

If no pseudonym exists, the subscriber then enters the details required by the service provider 22 (such as their name and address)—step G.

At this point the service provider 22 may prompt the subscriber to ask whether it would like to set up a pseudonym for use with that service provider. If the subscriber wishes to set up a pseudonym with that service provider, the service provider then requests relevant information from the subscriber, such as their name, address, music preference details and the like. Some of this information may be essential to set up a pseudonym (such as the subscriber's name and address), whereas other data may be optional (such as the subscriber's music preferences). It is considered advantageous that the subscriber can select which information is provided to the service provider for use in their pseudonym, and also advantageous that a pseudonym is for use with a particular service provider only. When the data for establishing the pseudonym has been entered, this information is passed via the link 106 to the authentication service 102 of the network 16. The pseudonym is stored by the service provider 22 but the data associated with that pseudonym is not permanently stored by the service provider 22 (that information is provided on request to the service provider 22 by the authentication service 102 of the network 16).

It is important to note that the service provider 22 only has access to data associated with the particular pseudonym that the subscriber uses in relation to that service provider. The separate records associated with pseudonyms for other service providers are stored separately by the network 16. This is advantageous because, for example, a subscriber may be willing for personal medical data to be associated with a pseudonym that that subscriber uses when obtaining services from their physician but would not wish this information to be made available to other service providers.

The subscriber searches the web site to identify the CD that the subscriber wishes to purchase. When the CD required by the subscriber is identified, the subscriber causes the client application 17 to send a request for service message to the service provider 22 (step H)—for example by making a mouse click on a "purchase CD" button provided by the web site. The message includes data identifying the CD required, data identifying the subscriber (such as the subscriber's SIM identifier), including a field indicating that the subscriber has installed on their PC a transaction manager 14 which can authenticate a transaction by means of the subscriber's SIM 12.

At this stage in the transaction, the service provider 22 has been provided with certain details of the subscriber, including the subscriber's name, address and the CD that they wish to order. This information might be provided by somebody who is not truly the subscriber. To authenticate the transaction the service provider 22 constructs a service context $S_C$ (step I). The service context is a data packet including the following fields:

An identifier of the service provider 22
The subscriber's name (or other identifier such as a SIM identifier)
Details of the transaction to be authenticated (in this case the purchase of a CD)
Additional or alternative information may of course also be provided.

The service context $S_c$ is sent via the Internet to the client application 17. The client application 17 passes the service context $S_c$ to the transaction manager 14 (step J). The client application 17 may add its own identifier to the service context $S_c$ to allow the network 16 to determine from which client application the transaction is derived.

The transaction manager 14 analyses the service context and establishes that a request for authentication of the transaction by the network 16 is required. The transaction manager detects whether the subscriber's dongle 30 containing their SIM 12 is present (step K). If the dongle 30 is not present, the user is prompted to make their dongle available. The transaction manager 14 may also display a description of the transaction to be authenticated—and the subscriber can be provided with the option to approve or disapprove the transaction. Assuming the dongle is present and the transaction is approved by the subscriber, the transaction manager 14 then sends a request to the authentication service 102 of the network 16 for a security token $S_x$ (step L). The request sent to the authentication service 102 includes the service context $S_c$. That data may be transmitted over any suitable network. The data may be transmitted via the Internet. The data may be transmitted over a fixed telephone network, or over the mobile or cellular infrastructure of telecommunications network 16.

The dongle 30 may include means for allowing a PIN or biometric data to be entered as described above in relation to FIG. 4. If the subscriber is prompted to enter their PIN, or provide other data, prior to authentication of a transaction, this provides an added level of security. The transaction manager 14 and/or SIM 12 may store a list of trusted client applications 17. These applications may be provided with a key (or other identifying data). For the trusted applications, the transaction manager and SIM may be configured to accept the key rather than requiring the subscriber to enter their PIN.

As an additional security feature, the dongle may be provided with a screen which displays the name of the application or organisation which requests information from the SIM 12, as described in relation to the FIGS. 3 and 4 embodiment. This would allow the user to monitor requests being made to his SIM 12. The dongle 30 can be programmed to display the name of the application or organisation requesting data from the SIM 12 and may then prompt the user to approve the supply of data for each or selected applications/organisations by entering the user's PIN using a keypad, or by providing other identifying data.

The subscriber will thereafter be authenticated by the authentication service 102 performing a challenge and response session with the SIM (by sending data via the transaction manager 14)—step M. For example, the authentication service 102 will send a random challenge to the transaction manager 14, which is transmitted to the SIM. The SIM responds by encrypting the random challenge using both an authentication algorithm and a unique key Ki resident within the SIM and assigned to that particular subscriber. The response is transmitted by the transaction manager to the authentication service 102. The authentication service 102 analyses the response to determine whether it is the response that would be expected from that subscriber's SIM. If the response is as expected, then the authentication service 106 issues a security token $S_x$ and sends this to the transaction manager (step N). The transaction manager 14 itself need not understand the data exchanged during the challenge and response procedure—it merely acts as a conduit for this data.

As described in relation to FIG. 3, to prevent, or to reduce, the likelihood of the transaction manager 14 being replaced or bypassed by an alternative application, which could compromise the security of the data on the SIM 12, the transaction manager 14 and the dongle interface driver may be provided with respective shared secret keys. Each communication from the transaction manager 14 to the dongle 30 is then encrypted using the shared secret key 40. All communications from the PC 10 to the dongle 30 are received by the dongle interface driver. The dongle interface driver comprises processing means for decrypting received communications using its secret key. To enhance security, the dongle interface driver will prevent all communications other than those encrypted using the shared secret key from sending data to or receiving data from the SIM 12.

Therefore, the transaction manager 14 controls and supervises access to the dongle 30 and the SIM 12 to reduce the likelihood of the data stored on the SIM 12 being compromised by unauthorised attempts to access the SIM 12.

However, it should be appreciated that the use of such shared secret keys is not essential.

If a payment for the transaction is required, details of the required payment are included in the service context $S_c$. This information is extracted from the security context $S_c$ by the authentication service 102. The authentication service 102 then sends a message to the payment service 104 via link 105 which reserves funds in the subscriber's account with the network 16. It is important to note that no payment is made, or authorised, at this stage. However, the payment service 104 is aware that a payment is likely to be required imminently, and appropriate funds are reserved in the user's account for that transaction.

The security token is a data packet which includes the Security Token Sx and the following fields:
  subscriber's identity—such as a SIM identifier
  an indication of the service provider 22 identity
  an indication of the service that has been authenticated—in this example the order of a particular CD
  an indication of the authentication service 102 identity
  an indication of which payment service should be used (if payment is required)
  Other fields may be provided additionally or alternatively, depending on the circumstances.

The security token $S_x$ is passed to the client application 17 (step O).

The client application 17 then passes the security token to the service provider 22 (step P).

The security token $S_x$ includes data specific to a particular subscriber and a transaction with a particular by the service provider 22. Numerous transactions may be handled by the network 16, transaction manger 14 and service provider 22 in parallel. These will be distinguishable from one another by virtue of the data specific to a particular transaction with a particular by the service provider 22 in the security token $S_x$.

If the security token $S_x$ is intercepted as it passes between the network 16 and the transaction manager 14, or between the client application 17 and the service provider 22, it will have no value to the interceptor. The security token $S_x$ is specific to particular transaction with a particular by the service provider 22, and the provision of a service to a particular subscriber.

On receipt of the security token $S_x$ by the service provider 22 its content is analysed and, if it is established that it corresponds to a service context Sc issued by the service provider 22, the service provider 22 may assume that the request for service (order of a CD) is legitimately made by the subscriber. The Service Provider 22 could present the Security Token Sx to the Authentication Service 102 to check the validity of the token. The authentication service 102 then checks the integrity of the Security Token Sx and validates the content of the Security Token Sx. The authentication service 102 then sends a response to the service provider 22 indicating that the Security Token Sx is valid. Alternatively, the authentication service 102 may send data to the service provider 22 that allow the service provider 22 itself to determine the integrity and validity of the Security Token Sx.

The service provider 22 then determines whether a payment needs to be made (step Q). If no payment is required the CD can then be despatched. However, if a payment is required, the service provider 22 then generates a payment context PC which includes the following fields:
  the security token $S_x$
  the amount of the payment requested
  Of course, further or additional fields may be required in accordance with the circumstances.

The payment context $P_C$ is sent to the client application 17 (step R). The client application passes the payment context $P_C$ to the transaction manager 14 (step S).

The transaction manager 17 then sends the payment context $P_c$ to the payment service 104 of the network 16 (step T). The payment context $P_c$ is analysed by the payment service 106. The presence of the security token $S_x$ in the payment context indicates to the payment service that this is a genuine request for payment associated with the subscriber indicated by the security token $S_x$, and the payment service then consults the subscriber's account with the network 16 to determine that the payment can be authorised (which might depend on the subscriber's credit rating and/or payment history with the network 16 and/or the status of their pre-pay amount) and, if appropriate, authorises the payment by issuing a payment token $P_x$ (step U).

The transaction manager 14 then sends the payment token $P_x$ to the client application 17 (step V). The client application 17 then sends the payment token $P_x$ to the service provider 22 (step W). The service provider 22 then uses the payment token $P_x$ to obtain payment from the payment service 106 of the network 16 (step X). To do this the service provider 22 transmits the payment token $P_x$ to the payment service 104 via link 108. The payment service analyses the payment token $P_x$ and recognises that this is a payment token that has been legitimately issued by the payment service to the transaction manager 14, and then makes the appropriate adjustment to the subscriber's account with the network 16.

Advantageously, if the user has a pseudonym associated with the service provider 22, the service provider 22 may update that pseudonym on the basis of any new information learnt about the subscriber from the transaction—for example, a change in music taste.

The communications between the PC 10 and the network 16 are preferably encrypted, as described above. It is also preferable for communications between the components within the PC 10 and within the network 16 to be encrypted—for example by use of shared keys.

In the arrangement described above, the subscriber is authenticated only when they wish to purchase a CD. In an alternative arrangement, the subscriber may be authenticated when they log onto the web site. The service provider will then have a security Token Sx relating to that subscriber's session with the web site. When the subscriber wishes to make a purchase, the Security Token Sx is sent to the authentication service 102. The authentication service 22, depending on the value of the purchase, for example, my either validate the Security Token Sx or require the service provider 22 to obtain a further security token via the client application 17, transaction manager 14 in the manner described above. Any pseudonym data relating to that subscriber and for that service provider 22 can be provided to the service provider 22 upon authentication of the subscriber.

The Security Token Sx may be valid for a limited time period. The SIM is advantageously provided with means for accurately determining the true time—for example with a tamper-resistant internal clock, a clock provided by the PC 10, or a time indication from the network 16 (which will be a "trusted" time).

The subscriber may obtain network services 100 from the network 16 in a similar manner to the way in which services are obtained from the service provider 22. That is, the network service provider 100 will issue a service context $S_c$ when the request for service is received from the client application 17. A security token $S_c$ is obtained from the authentication service 102 via the transaction manager 14 following authentication using the SIM 12. Payment by the subscriber for the network services may be performed in the manner as described in relation to the service provider 22 (by issuance of a payment context $P_c$ and the generation of a payment token $P_x$).

It is also possible that a direct link is provided between a remote service provider 22 and a network service provider 100, as indicated by a link 107. This will allow network services to be provided to a subscriber by means of a remote service request made to a service provider 22.

For the purposes of the remote service provider 22 obtaining services from network service provider 100, the remote service provider 22 is provided with a unique identifier for use with the network service provider 100. When the remote service provider 22 wishes to obtain a network service from network service provider 100 on behalf of a subscriber, this unique identifier is transmitted to the network service provider together with a request for the network service. The network service is then provided as requested and a charge made by the network service provider 100 to the account of the service provider 22 with the network 16. The remote service provider 22 will typically wish to make a charge to the subscriber for use of the relevant network service (to cover the costs that the remote service provider 22 has incurred and charges for any additional services provided by the remote service provider 22), and payment for this will be obtained by issuing a payment context $P_c$ and obtaining a payment token $P_x$ in the manner described above.

It has already been explained above that the transaction manager 14 and client application 17 could be provided in a device other than a PC 10—such as in a parking meter or a vending machine or ticketing.

A further example of the use of this system will now be described in relation to the renting of a vehicle. A subscriber to network 16 couples their dongle to a PC 10 (or other processing device) at the offices of the vehicle rental company. The PC 10 includes the transaction manager 14 and a client application 17 for providing access to the vehicle rental service provider 22.

If the subscriber has a pseudonym for use with the service provider 22, the subscriber will provide this to the service provider 22, which is then able to access relevant data relating to the subscriber from the authentication service 102 of the network 16. If the subscriber does not have a pseudonym associated with the service provider 22, the user provides relevant details when prompted by the service provider 22, such as the subscriber's name, address, the type of vehicle they wish to rent and the duration of the rental period.

The service provider 22 then creates an appropriate service context $S_c$ and transmits this to the client application 17. The transaction manager 14 receives the service context $S_c$ and passes this to the authentication service 102 of the network 16 to seek a security token $S_x$ following authentication of the transaction by the challenge and response procedure performed between the authentication service 102 and the SIM 12 via the transaction manager 14 in the manner described above. If the SIM 12 is authenticated by the authentication service 102 of the network 16, a security token $S_x$ is issued to the transaction manager 14. The security token $S_s$ is passed to the client application 17, and from there to the service provider 22 to authenticate the transaction.

By means of a link 105 between the authentication service 102 and the payment service 104, appropriate funds can be reserved from the subscriber's account with the network 16. For example, funds may be reserved to cover the expected rental charges and possibly a deposit.

Because the total charge for renting the car may not be known (as it may depend on the distance traveled by the subscriber, the amount of time the subscriber spends driving the vehicle and the date on which the vehicle is in fact returned), a payment context $P_c$ may not be issued by the service provider 22 at this stage.

Thus far, the subscriber has authenticated the transaction with the vehicle rental company. The vehicle rental company will then allocate a car. According to an optional feature of this embodiment, the dongle may allow the user to enter and drive the car—that is, the dongle will act as substitute to a conventional key for the vehicle. This may be achieved by providing the vehicle with means for authenticating the SIM on the subscriber's dongle, or alternatively may be performed by providing the dongle with a storage location for storing security information specific to the vehicle rental company. This security information is interrogated by the vehicle, and if validated will allow use of the vehicle.

Whether or not the dongle is in fact used to obtain access to the vehicle and allow the vehicle to be driven, by coupling the dongle to the vehicle access to the mobile network 16 may be provided in the conventional way using a mobile telephone transceiver built into the vehicle. The coupling of the dongle to the telecommunication system of the vehicle is analogous to inserting the subscriber's SIM into a fixed telephone provided on the vehicle. If there is not coverage by the network 16 in the area that the vehicle is located, telephone calls can still be made where a roaming agreement is present between the subscriber's network 16 and any network that is operational in the locality of the vehicle.

The coupling of the dongle to the vehicle systems may also allow the vehicle rental company to calculate the amount of time that the subscriber has spent using the vehicle, and the vehicle rental company may wish to charge the user on this basis.

When the vehicle is returned to the rental company, an appropriate charge is calculated by the vehicle rental company service provider 22 (possibly using information from the vehicle systems as described above), and an appropriate payment context $P_c$ is generated and transmitted to the client application 17 present on PC 10 (which could be a different PC from the PC 10 used to initiate the transaction with the vehicle rental company. The transaction manager 14 of the PC 10 then receives the payment context $P_c$ and obtains from the payment service 104 of the network 16 a payment token $P_x$. This is passed to the service provider 22 via the transaction manager 14 and client application 17, and the service provider 22 is then able to collect the appropriate payment from the payment service 104 of the network 16.

In a further example, the transaction manager 14 and the client application 17 are provided in a vehicle as part of the vehicle's on-board telecommunication system. The vehicle, for example in a convenient position on the dashboard, includes a connector to receive a subscriber's dongle 30 (although, of course, a wireless connection could alternatively be provided). When the subscriber inserts the dongle 30, access to remote services provided by service providers 22 may be obtained using the transaction manager 14 and client application 17 in the manner described in relation to FIGS. 6 and 7.

Because the vehicle is, of course, mobile, communications between the client application 17 and the remote service provider 22 and communications between the transaction manager 14 and the authentication service 102 and the payment service 104 (or between the client application 17 and the network service 100) will be provided by a wireless link, such as by use of a mobile or cellular radio network using a telephone transceiver already present in the vehicle. The network used to perform these communications may be the same as the network 16 providing the authentication and payment services 102 and 104, or may be a different network.

While inserting the dongle 30 into the connector of the vehicle, the user may also be able to make and receive telephone calls in the usual manner as if the user had inserted their SIM card in a fixed mobile telephone system of the vehicle. However, because the transaction manager 14 and client application 17 are present, the subscriber is also able to obtain other services from remote service providers 22. For example, the subscriber may wish to download music in the form MP3 files to the car audio system, or obtain navigation or traffic information.

The authentication and payment procedure described above in relation to FIGS. 6 and 7 may be modified from step N onwards. When the authentication service 102 has received the service context Sc and has authenticated the subscriber, a request to the payment service 104 is then made via link 105 to reserve the appropriate funds. This request includes the security token Sx—which allows the payment service 104 to validate the request. The payment service 104 then issues a payment token $P_x$. The transaction manager 14 then passes the payment token $P_x$ with the security token Sx to the client application 17. The client application 17 sends the payment token $P_x$ with the security token Sx to the service provider 22. The service provider 22 then confirms the validity of the payment token $P_x$ by sending this to the payment service 104 via link 108 and confirms the validity of the security token Sx by sending this to the authentication service 102 via link 106.

As an alternative to obtaining subscriber pseudonyms in the manner described above, the Service Provider 22 may present the Security Token $S_x$ to the Authentication Service 102 in conjunction with a request for any pseudonym associated with the SIM 12 and the Service Provider 22. The Authentication Service 102 validates the token and returns the appropriate Pseudonym (or related data) to the Service Provider 22.

To enhance the security of the system the Service Provider 22 could be provided with a Certificate (shared key) which is used to encode all requests from the Service Provider 22 to the Authentication service 102. Thus the Authentication Service 22 can then have a degree of trust in who is making the requests for Pseudonym or associated SIM data.

The service provider, being sure that the subscriber or payment is authenticated, is then able to despatch the CD to the subscriber.

In order to obtain payment the service provider 22 may proceed in one or two ways.

In the first procedure the service provider 22 issues a request for payment clearance by sending a data packet including the payment token $P_x$ (and the Security Token $S_x$) to the client application 17. The client application 17 passes the payment clearance request to the transaction manager 14, which in turn passes the payment clearance request (with the payment token $P_x$) to the payment service 104. At this point the payment service may instruct the authentication service 102, via link 105, to authenticate the subscriber by challenge and response data exchanged with the SIM 12 (via the transaction manager 14), although this is an optional step. In any event, the payment service 104 checks the payment token $P_x$ and the security token $S_x$ (contained in the same packet) and then clears funds in the subscriber's account with the network 16. The payment service 104 then sends a modified payment token $P_{x1}$ to the transaction manager 14. The transaction manager 14 passes the modified payment token $P_{x1}$ to the service provider 22 via the client application 17. The service provider 22 is then able to validate the payment token by direct link 108 with a payment service 104.

As an alternative to the procedure described above, the service provider 22 may request the payment service 104 for payment clearance via link 108 by sending the appropriate payment token $P_x$. The payment service 104 then validates the payment token and clears the funds. The payment service 104 responds to the service provider 22 confirming that the payment has been cleared.

Figure 6:
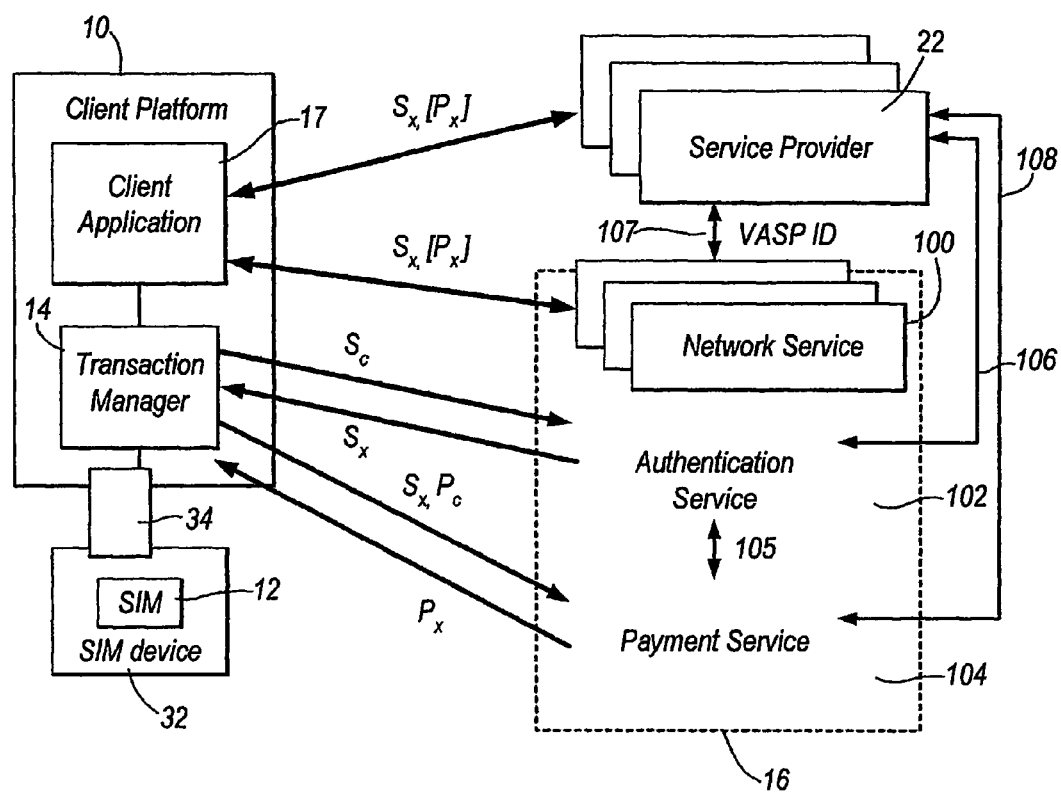
FIG. 6 shows a block diagram for explaining the operation of a method of authenticating a transaction using data processing apparatus.
Figure 7A:
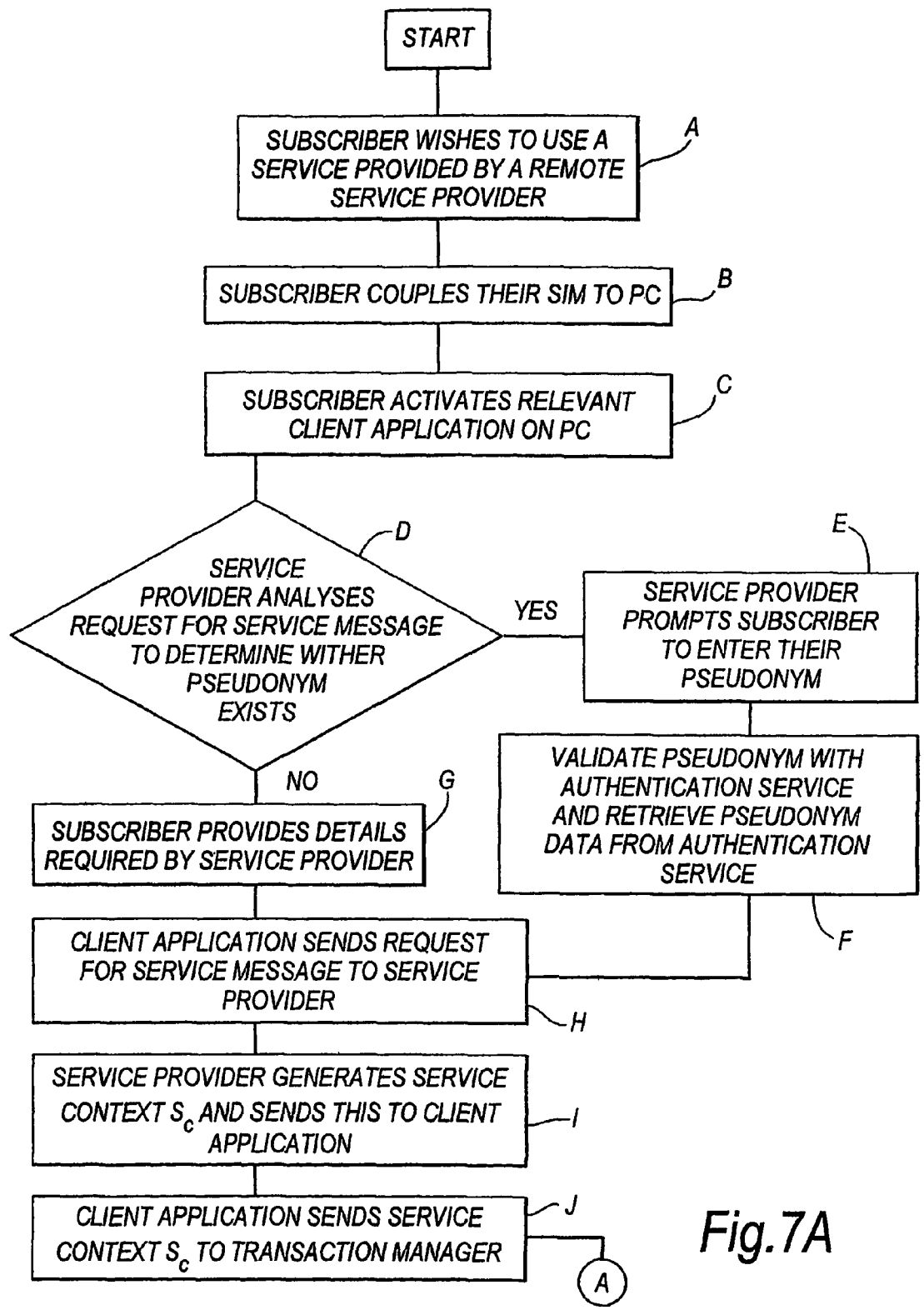
FIGS. 7A, 7B and 7C are a flow chart for use in understanding the authentication process carried out by the data processing apparatus of FIG. 6.
Figure 7B:
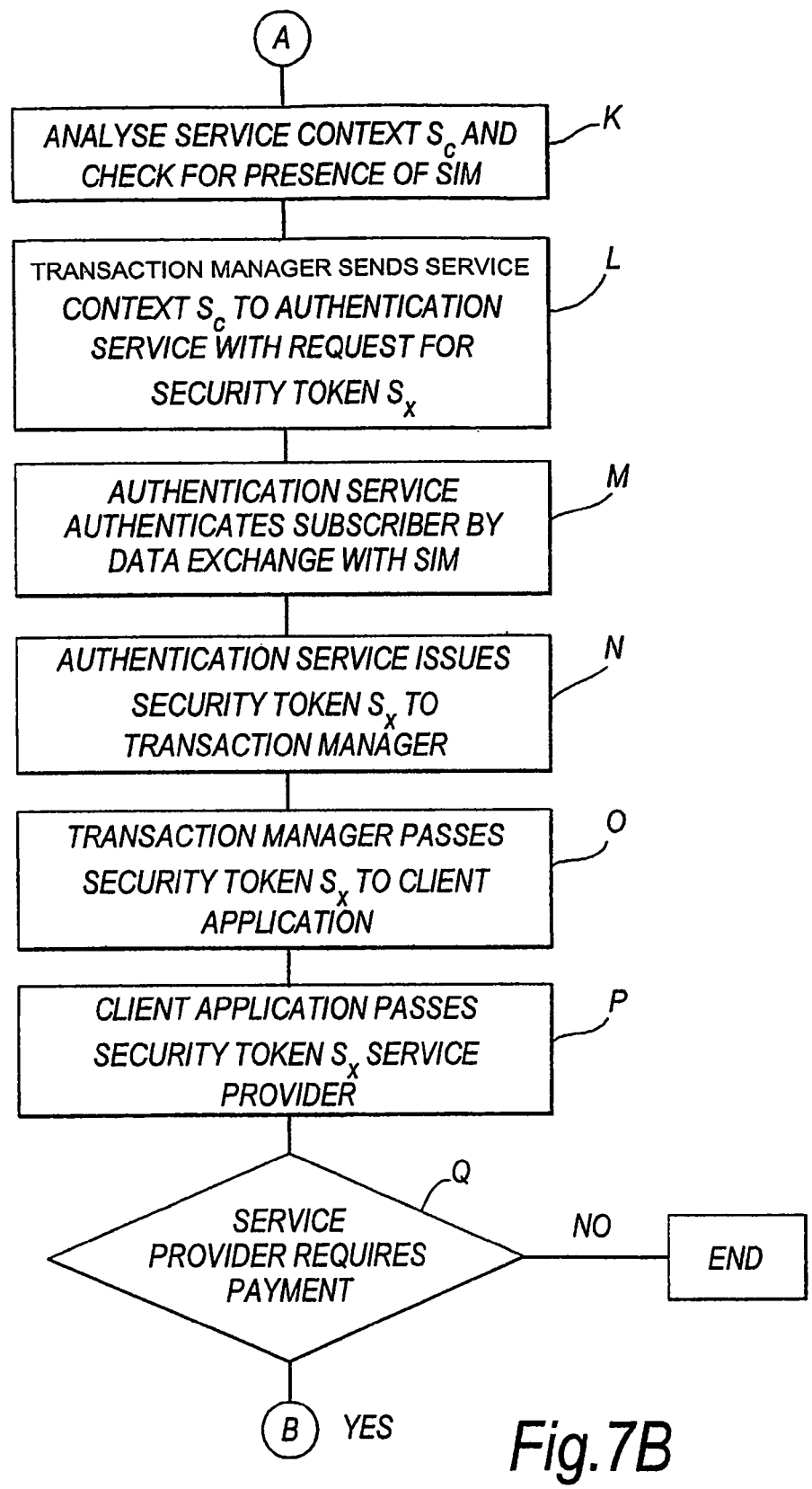
Figure 7C:
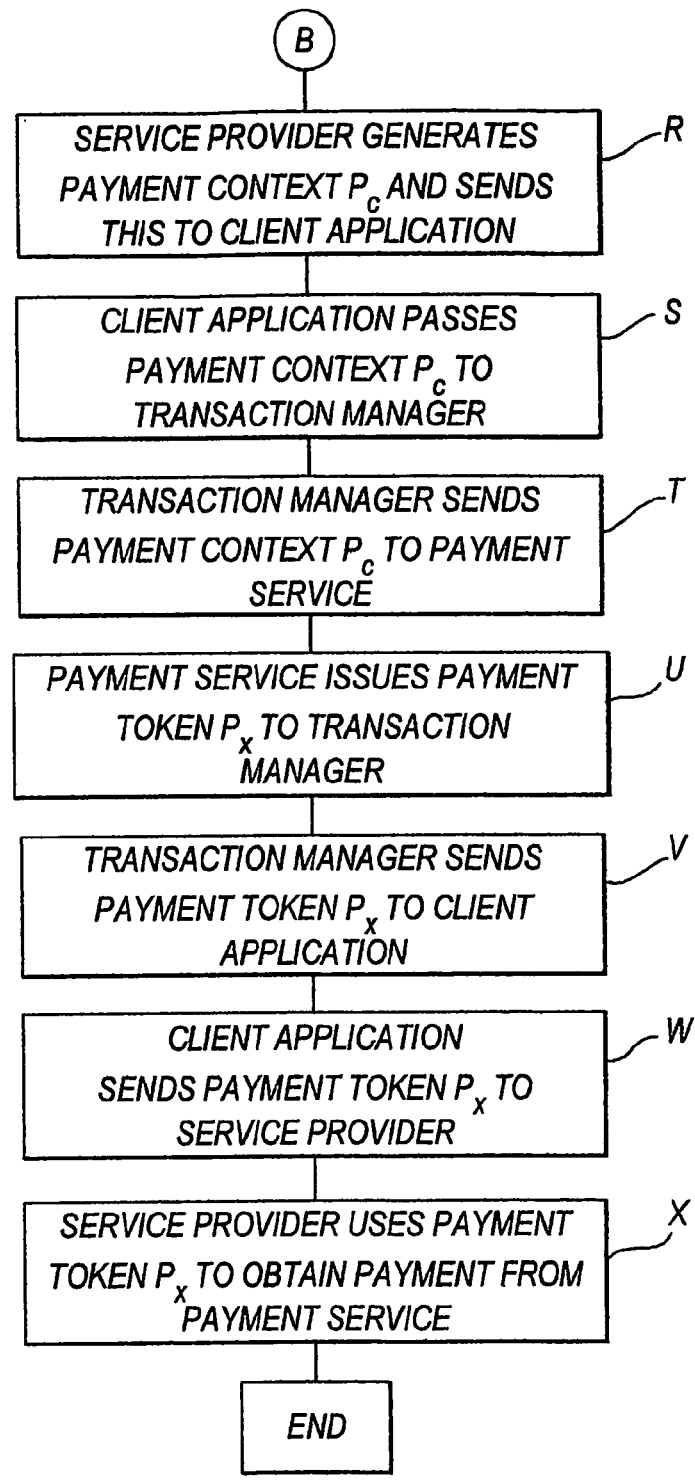

FIGS. 8 to 11 show further examples of dongle configurations that could be used in conjunction with the systems described in relation to FIG. 1 or 6 as an alternative to the first configuration shown in FIG. 4 and the second configuration shown in FIG. 5.

FIGS. 8A to 8D show a third configuration of a dongle indicated generally at 250. The dongle 250 does not include a display or push buttons. The dongle 50 is of generally elliptical cross-section and includes a generally rectangular aperture 252 formed in the top end thereof that allows an electrical connector 254 of generally rectangular cross-section to emerge therefrom. The aperture 252 is closed by a closure member 256 which is generally C-shaped in cross-section, extending from the top of dongle 250 along each side face 258, and pivoted about a centrally mounted pivot point 260. The connection between the closure member 256 and the side walls 258 of the dongle 250 at the pivot point 60 allows the closure member 256 to be rotated about the pivot point 260 as shown by arrow 262.

Figure 8A:
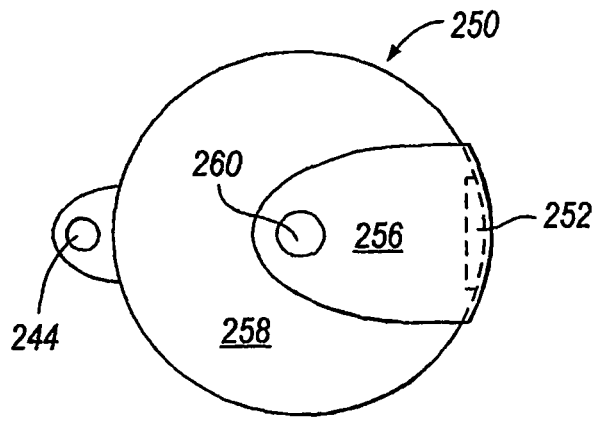
FIG. 8A shows a front view of a third configuration of a dongle.
Figure 8B:
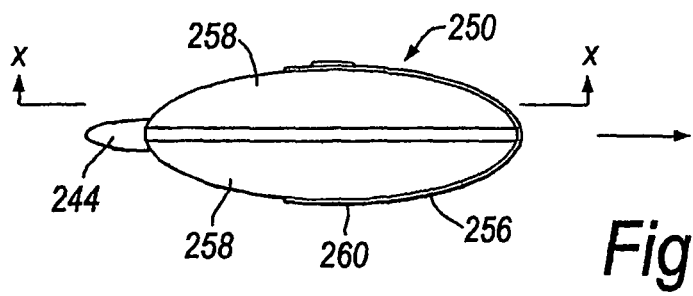
FIG. 8B shows a side view of the dongle of FIG. 8A.
Figure 8C:
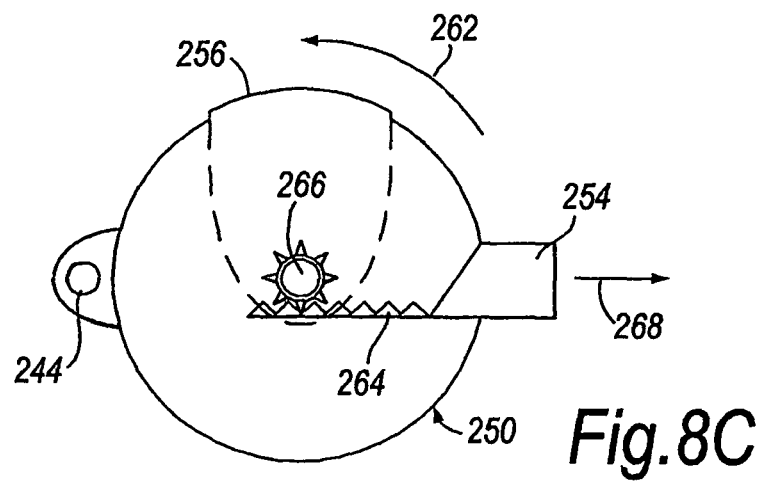
FIG. 8C shows a cross-sectional view taken along line x-x of FIG. 8B but with the dongle connector extended.
Figure 8D:
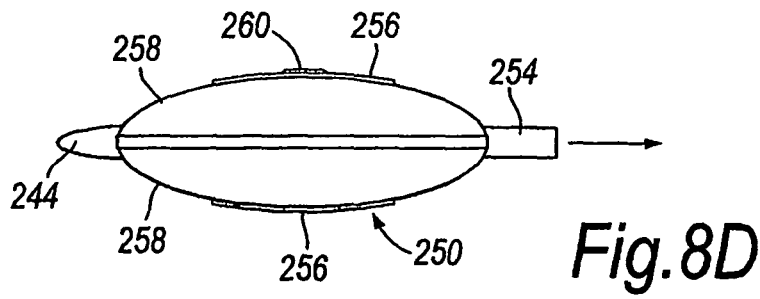
FIG. 8D shows a side view corresponding to FIG. 8B but with the dongle connector extended.
Figure 9A:
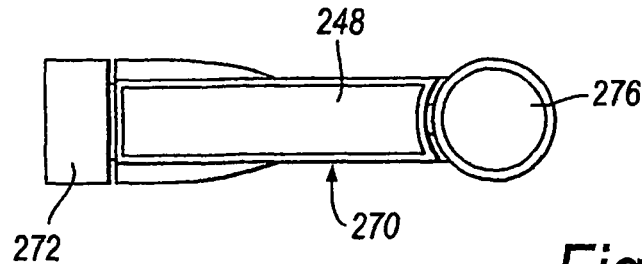
FIG. 9A shows a front view of a fourth configuration of a dongle.
Figure 9B:
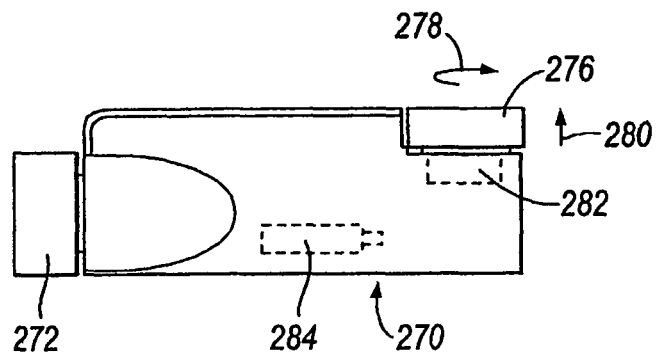
FIG. 9B shows a side view of the dongle of FIG. 9A.
Figure 9C:
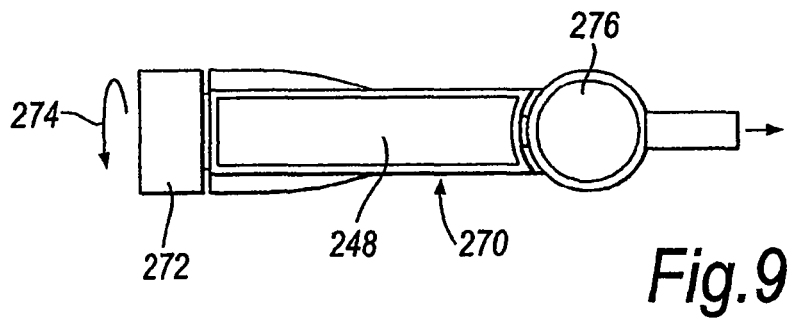
FIG. 9C shows a front view corresponding to FIG. 9A but with the dongle connector extended.
Figure 9D:
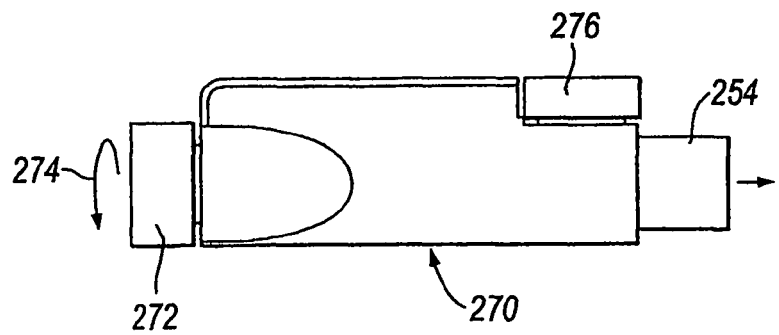
FIG. 9D shows a side view corresponding to FIG. 9B but with the dongle connector extended.
Figure 10A:
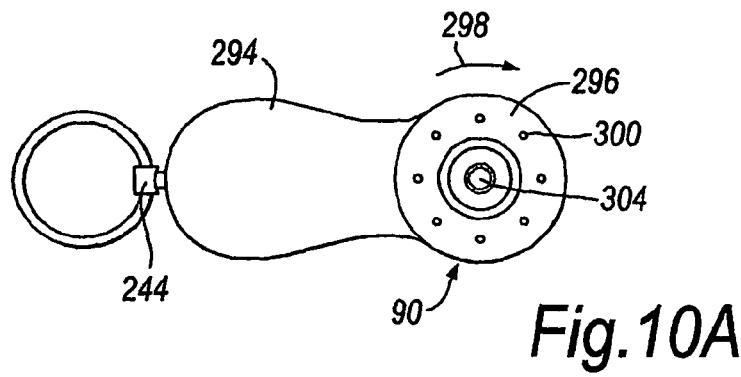
FIG. 10A shows a front view of a fifth configuration of a dongle.
Figure 10B:
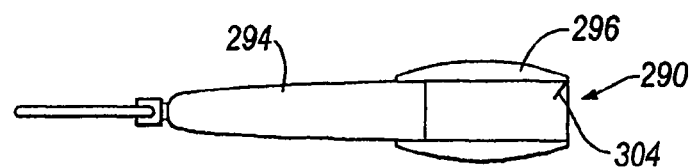
FIG. 10B shows a side view of the dongle of FIG. 10A.
Figure 10C:
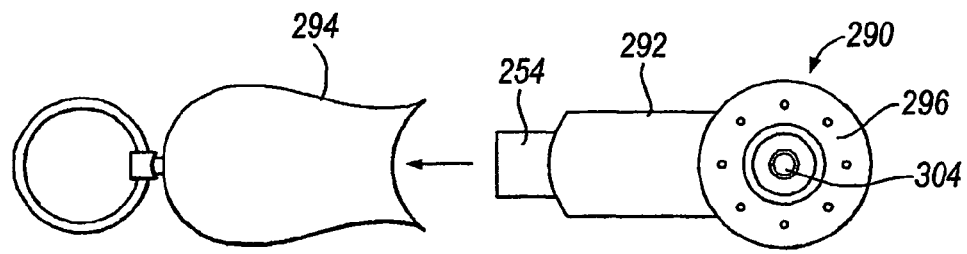
FIG. 10C shows a front view corresponding to FIG. 10A but with the dongle connector extended.
Figure 10D:
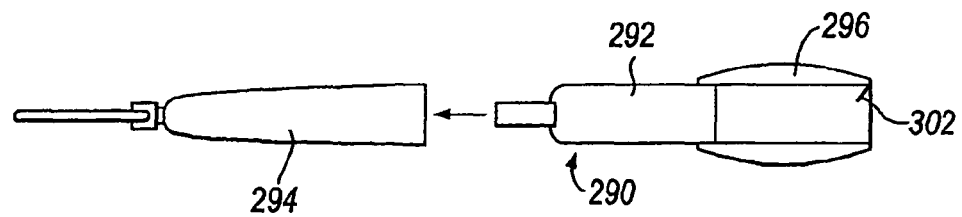
FIG. 10D shows a side view corresponding to FIG. 10B but with the dongle connector extended.

FIG. 5C is a cross-section taken along line X-X of FIG. 8B and shows schematically the mechanism by which the electrical connector 254 can be moved between a first position, shown in FIGS. 5A and 8B, where the connector 54 is contained wholly within the casing of the dongle 250, and the second position, shown in FIGS. 5C and 5D, where the electrical connector 254 protrudes from the casing of the dongle 250. The mechanism for providing this movement of the electrical connector 254 comprises a rack 264 which is coupled to the connector 254 and a cooperating pinion 266, mounted at pivot point 260, the teeth of which engage the rack 264. The pinion 266 is fixed with respect to the closure member 256. Rotation of the closure member 256 causes rotation of the pinion 266, which causes linear displacement of the rack 264 as shown by arrow 268. Of course, a mechanism for slidably supporting the electrical connector 254 and rack 264 is provided in a manner that will be understood by those skilled in the art, and is not illustrated or described further here.

FIGS. 9A to 9D show a fourth configuration of a dongle. As in the third configuration of dongle described in relation to FIGS. 8A to 8D, the electrical connector 254 is movable between a first position, shown in FIGS. 9A and 9B, where it is contained completely within the casing of the dongle 270, and a second position, shown in FIGS. 9C and 9D, where the connector 254 is shown extending from the casing of dongle 270. However, in the third configuration, the linear movement of the electrical connector 254 in the direction of arrow 268 is provided by rotating knob 272 with respect to the casing of dongle 270 as shown by arrow 274. Rotation of the knob 272 in a first direction causes the connector 254 to emerge from the casing of dongle 270, and rotation in the opposite direction causes the connector 254 to be retracted within the casing of the dongle 270. Any suitable mechanism for converting the rotary motion of the knob 272 into linear motion of the connector 254 may be provided. For example, a mechanism described in U.S. Pat. No. 5,813,421 (which is incorporated herein by reference) for a lipstick swivel mechanism may be employed. Other suitable mechanisms will be known to those skilled in the relevant art.

The dongle 270 includes a display 248 for prompting the user to enter their PIN number and/or for displaying the PIN number as it is entered. The dongle 270, rather than having a series of push buttons (such as a numerical key pad) comprises a data entry knob 276 which is mounted to the dongle for rotation as shown by arrow 278 and also for linear motion with respect to the dongle as shown by arrow 280. Each digit of the PIN number is input by the user grasping the knob 276 and pulling it in a direction away from the casing of the dongle 270 (in the direction of arrow 280). An indication, such as a flashing cursor then appears on the display 248 indicating that the first digit of the PIN number is expected. The number is input by rotation of the knob 276 (arrow 278), the displayed number increasing in value with further rotation of the knob 276. When the required number appears on the display 248 the user confirms that this is the number they wish to input by pushing the knob 276 in the opposite direction to arrow 280. To input the next digit of the PIN number the knob 276 is again lifted (arrow 280) and the correct number is selected by rotation of the knob. The required number is entered by returning the knob 276 to its original position by moving it in the direction opposite to the arrow 280. This procedure is repeated until all of the digits of the PIN number have been entered. Each digit of the PIN number as it is entered will be displayed on the display 248.

In the FIGS. 9A to 9D embodiment of the dongle 270, a piezo electric cell 282 is associated with the knob 280. The piezo electric cell 282 allows power to be generated by movement of the knob 276. This power may either be stored in an integral capacitor or may be stored in an optional cell 284 which is electrically coupled to the piezo electric cell 282. Such an arrangement obviates the requirement for the dongle 270 to have its own replaceable power source, whilst allowing the dongle to be operated when not connected to the PC 10. The charge generated by the piezo electric cell is transient, and after a period of time (for example, 5 minutes), the charge is dissipated and any PIN number entered by means of the knob 276 is lost from the memory of the dongle 270 and cannot later be retrieved even when power is supplied. This provides an additional security feature to the dongle 270. Of course, if the dongle 270 is connected to the PC 10 while the charge is still present (within 5 minutes of entering the PIN in the example given above), the PIN can be verified and the dongle can then obtain power from the PC10 via the connector 254 which allows authentication operations described above to be performed despite the transient nature of the power from the piezo electric cell 282.

FIGS. 10A to 10D show a fifth configuration of dongle 290. In this embodiment the dongle 290 comprises a main body part 292 to which the electrical connector 254 is attached in a fixed position, and a removable protective cap 294 which, when in position, covers the main body 292 and the connector 254 to protect those components and to provide the dongle 290 with an attractive external appearance.

At the top end of the main body 292 an annular knob 296 is mounted to the body 292 for rotation with respect to the body 292, as shown by arrow 298. The knob 296 includes a series of markings 300 visible to the user of the dongle 290—for example, each mark 300 indicating a different digit from 0 to 9. A marking 302 is provided at the top of the casing 292. In this embodiment, the first digit of the user's PIN number is entered by rotating the knob 96 until the correct digit of the PIN number (indicated at 300) is aligned with the mark 302. When the relevant digit and the mark 302 are aligned, the user stops rotation of the knob 296. When movement of the knob 296 stops, the position of the knob 296 is recorded by the dongle 290 so that the digit of the PIN number can be detected. The next digit of the PIN number is entered by rotating the knob 296 in an anti-clockwise direction (opposite to arrow 298) until the relevant digit of the PIN number is aligned with marking 302. Again, when the rotation of the knob stops, the position of the knob is recorded so that the PIN number can be recorded by the dongle 290. The next digit of the PIN number is entered by clockwise rotation of the knob 296, and so on, until all of the digits of the PIN number have been entered. The manner of data entry using the knob 296 and the marking 302 is similar to that used to enter the combination of a safe.

The dongle 290 further includes an optional digital camera 304 mounted at the axis of rotation of the knob 296 (but fixed with respect to the main body 292). Dongle 290 includes processing means and memory for storing one or more images captured by the camera 304, and allows these images to be transferred to the PC 10 using the connector 254.

FIGS. 11A to 11C show a sixth configuration of a dongle 310. The dongle 310 comprises a casing 312 which has an opening 314 at one side thereof. Contained within the casing 312 is a coupling portion 316 to which the electrical connector 254 is fixed. The coupling portion 316 is connected to the casing 312 in such a manner that the coupling portion 316 is rotatable about an axis indicated by dotted line 318.

Connected to the loop connector 244 is a ring 320, which provides a convenient means by means a slidable part 322, which is mounted for sliding with respect to the casing 312, may be moved with respect to the casing 312 in the direction of arrow 324. By means of a rack and pinion or any other suitable mechanism (not shown) the movement of the sliding part 322 with respect to the casing 312 in the direction of arrow 324 is translated into rotational movement of the coupling portion 316 about the axis 318. The different positions that the coupling part 316 moves through as the sliding part 322 is moved with respect to the casing 312 are shown by the ghost lines in FIG. 11C.

When the sliding part 322 reaches its maximum travel in the direction of arrow 324, the coupling part 316 is rotated 180° with respect to the casing 312. The coupling portion 316 is returned to the position shown in FIGS. 11A and 11B by sliding the sliding part 322 in the direction opposite to arrow 324. When the coupling part 316 is in the position shown in FIGS. 11A and 11B, the connector 254 is protected by the sliding part 322.

The embodiments shown in FIGS. 8,9,10 and 11 provide various means by which the electrical connector 254 can be concealed and protected when not required.

In the FIG. 9 embodiment the power source of the dongle is piezo electric cell 282.

A similar power source may be provided in the dongles illustrated in FIGS. 8,10 and 11, with power being generated by movement of the closure member 256 of the dongle 250 of FIG. 8, the movement of the knob 296 of the dongle 290 of FIG. 107, or movement of the sliding part 322 of FIG. 11. Alternatively, or additionally, these dongles may include a replaceable battery or a rechargeable battery which is recharged when the dongle 250,280,290,310 is connected to the PC 10.

Whilst the dongles described include an electrical connector 254 which is shown as a USB connector, it should be appreciated that any other suitable type of electrical connector may be provided. For example, the connector 254 may be a SmartMedia (trade mark) device. Alternatively, data and/or power may be transmitted between the dongle and the PC 10 by "near field" technology, for example, in accordance with the Near Field Communication Interface and Protocol (NFCIP-1) protocol. If near field technology is employed, the provision of a movable electrical connector 254 will not be necessary.

The dongles of FIGS. 8 to 11 may or may not include the dongle interface driver 36 described in relation to FIGS. 3 and 4.

The dongles of FIGS. 9 and 10 may allow the PIN to be passed to the PC 10 for validation, or such validation may be performed within the dongle for improved security.

Of course, the dongles of FIGS. 8 and 11 may be provided with a PIN entry means if required.

The invention claimed is:

1. A method for utilizing an authentication service provided for a telecommunications system to carry out an authentication process for authenticating a transaction with an entity by one of a plurality of users operating a data processing apparatus that is communicatively coupled to the telecommunications system, the method comprising:
storing, by the authentication service, for each user of the plurality of users, on a data store accessible by the authentication service, a respective predetermined authentication information of the user;
wherein the stored respective predetermined authentication information for each user corresponds to respective actual authenticating information of an identification mechanism registered with the telecommunications system in association with a telecommunications terminal of the user;
establishing a communication between a transaction manager implemented by the data processing apparatus and an application service provided by the entity;
initiating, by the data processing apparatus, a desired transaction with the entity for a first user operating the data processing apparatus;
transmitting, by the transaction manager of the data processing apparatus, data related to the desired transaction from the data processing apparatus to the application service;
receiving, by the application service, the data related to the desired transaction transmitted from the data processing apparatus;
generating, by the application service, based on the received data related to the desired transaction, transaction data relating to the desired transaction;
creating a connection between the application service and the authentication service via a common network;
transmitting, by the application service, the generated transaction data to the authentication service;
receiving a request for authentication of the desired transaction for the first user;
receiving, by the transaction manager of the data processing apparatus, an indication of the respective actual authenticating information of the identification mechanism associated with the telecommunications terminal of the first user;
transmitting, by the transaction manager of the data processing apparatus, to the authentication service, the received indication of the respective actual authenticating information of the identification mechanism associated with the telecommunications terminal of the first user;
wherein transmitting the received indication of the respective actual authenticating information of the identification mechanism associated with the telecommunications terminal of the first user to the authentication service does not require use of the telecommunications terminal of the first user;
receiving, by the authentication service, the transmitted indication of the respective actual authenticating information of the identification mechanism associated with the telecommunications terminal of the first user;
determining, by the authentication service, whether there is a match between the respective predetermined authentication information of the first user stored in the data store and the respective actual authenticating information of the identification mechanism associated with the telecommunications terminal of the first user;
based on a determination, by the authentication service, that there is a match between the respective predetermined authentication information of the first user stored in the data store and the respective actual authenticating information of the identification mechanism associated with the telecommunications terminal of the first user, transmitting a communication of the match to the transaction manager of the data processing apparatus;
receiving, by the transaction manager of the data processing apparatus, the transmitted communication of the match from the authentication service; and
completing, by the transaction manager of the data processing apparatus, the desired transaction for the first user with the entity via the data processing apparatus.

2. The method of claim 1, wherein the identification mechanism that is associated with the telecommunication terminal of each user of the plurality of users is an authentication storage device that stores the respective actual authenticating information for the user, and wherein the respective actual authenticating information stored by the authentication storage device for each user of the plurality of users corresponds to information which is used to authenticate the user of that authentication storage device in relation to the telecommunications system.

3. The method of claim 1, wherein the identification mechanism associated with the telecommunications terminal of the first user corresponds to or simulates a smart card or subscriber identity module for the first user that is used by to authenticate the first user in the telecommunications system.

4. The method of claim 3, wherein, for the smart card or subscriber identity module to be utilized in the authentication processes for authenticating the desired transaction with the entity for the first user, the smart card or subscriber identity module must be operable in a terminal usable in a mobile and/or cellular telecommunications system.

5. The method of claim 4, wherein the smart card or subscriber identity module is used to authenticate the terminal in the mobile and/or cellular telecommunications system.

6. The method of claim 2, further comprising incorporating the authentication storage device for the first user on a data carrier for data or software configured for use by the data processing apparatus being operated by the first user.

7. The method of claim 1, wherein authenticating of the first user to the application service provided by the entity includes sending of a message from the authentication service to the transaction manager, generating a response: by the transaction manager: for the authentication service that is dependent on the message and the respective actual authenticating information of the identification mechanism associated with the telecommunications terminal of the first user, and transmitting the response by the transaction manager to the authentication service.

8. The method of claim 2, further comprising operatively coupling the authentication storage device for the first user for communication over a carrier with the transaction manager.

9. The method of claim 8, wherein the carrier is operatively coupled to the data processing apparatus by a wireless link.

10. The method of claim 8, wherein the authentication storage device for the first user is removably coupled to the carrier.

11. The method of claim 8, further comprising using said carrier to obtain user security data independently of the data processing apparatus, and analyzing the user security data for determining whether to allow access to the respective actual authenticating information of the identifications mechanism associated with the telecommunications terminal of the first user.

12. The method of claim 11, wherein the security data is obtained by alphanumeric data entry.

13. The method of claim 12, wherein the user security data comprises a Personal Identification Number (PIN), wherein analyzing the user security data includes comparing the PIN obtained by data entry with a PIN stored on the authentication storage device for the first user, determining whether there is a match between the PIN obtained by the security data entry device and the PIN stored on the authentication storage device, and in determining that there is a match between the PIN; and based on a determination that there is a match between the PINs, accessing to the actual authenticating information.

14. The method of claim 8, wherein communication with the data processing apparatus is controlled by a data processing module of the carrier.

15. The method of claim 14, wherein the data processing module of the carrier decrypts encrypted data received from a data processing module of the data processing apparatus.

16. The method of claim 14, wherein the data processing module of the carrier encrypts data transmitted to a data processing module of the data processing apparatus.

17. The method of claim 15, wherein the respective data processing modules comprise a key for allowing encryption and/or decryption of data.

18. The method of claim 17, wherein the key comprises a shared secret key for each of the respective data processing modules.

19. The method of claim 8, wherein the carrier is operatively coupled to a plurality of respective authentication storage devices of the plurality of users for implementing the authentication process for authenticating desired transactions for the plurality of users.

20. The method of claim 2, wherein the transaction manager of the data processing apparatus routes communications between the authentication storage device for the first user and the telecommunications system.

21. The method of claim 2, wherein the transaction manager of the data processing apparatus detects operative coupling of the authentication storage device for the first user.

22. The method of claim 20, wherein the transaction manager of the data processing apparatus transmits data relating to an authenticated transaction to a corresponding entity to which the authenticated transaction relates.

* * * * *